United States Patent
Asmus et al.

(10) Patent No.: US 9,835,347 B2
(45) Date of Patent: Dec. 5, 2017

(54) STATE-BASED CONTROL IN AN AIR HANDLING UNIT

(71) Applicant: Johnson Controls Technology Company, Holland, MI (US)

(72) Inventors: Matthew J. Asmus, Watertown, WI (US); Peter A. Kinsella, Milwaukee, WI (US)

(73) Assignee: Johnson Controls Technology Company, Milwaukee, WI (US)

( * ) Notice: Subject to any disclaimer, the term of this patent is extended or adjusted under 35 U.S.C. 154(b) by 463 days.

(21) Appl. No.: 14/563,771

(22) Filed: Dec. 8, 2014

(65) Prior Publication Data

US 2016/0161139 A1 Jun. 9, 2016

(51) Int. Cl.
  *F24F 11/00* (2006.01)
  *F24F 11/04* (2006.01)
  *G05D 23/19* (2006.01)

(52) U.S. Cl.
  CPC ........ *F24F 11/0012* (2013.01); *F24F 11/006* (2013.01); *F24F 11/0079* (2013.01); *F24F 11/04* (2013.01); *G05D 23/1928* (2013.01); *F24F 2011/0046* (2013.01); *F24F 2011/0056* (2013.01); *F24F 2011/0063* (2013.01); *F24F 2011/0064* (2013.01); *F24F 2011/0067* (2013.01); *F24F 2011/0068* (2013.01); *Y02B 30/746* (2013.01)

(58) Field of Classification Search
  CPC ...... F24F 3/0442; F24F 3/048; F24F 11/0012; F24F 11/008; F24F 11/0079; F24F 2011/0046; F24F 2003/0446
  See application file for complete search history.

(56) References Cited

U.S. PATENT DOCUMENTS

| | | | | |
|---|---|---|---|---|
| 2,194,694 A | * | 3/1940 | Denker | F24D 5/00 137/109 |
| 4,203,485 A | * | 5/1980 | Zilbermann | F24F 3/0442 165/217 |
| 4,886,110 A | * | 12/1989 | Jackson | F24F 3/044 165/217 |
| 5,170,635 A | * | 12/1992 | Wruck | F24F 3/06 62/140 |
| 5,347,821 A | | 9/1994 | Oltman et al. | |
| 5,355,691 A | * | 10/1994 | Sullivan | F04D 27/0261 415/17 |
| 5,419,146 A | | 5/1995 | Sibik et al. | |
| 5,427,461 A | | 6/1995 | Hirai et al. | |

(Continued)

Primary Examiner — Devon Russell

(74) Attorney, Agent, or Firm — Foley & Lardner LLP

(57) ABSTRACT

A state-based control system for an air handling unit (AHU) includes a finite state machine configured to transition between a high cooling load state and a low cooling load state. In the high cooling load state, the system maintains the temperature of a supply airstream provided by the AHU at a fixed setpoint and controls the temperature of a building zone by modulating the speed of a supply air fan. In the low cooling load state, the system operates the supply air fan at a fixed speed and controls the zone temperature by modulating an amount of cooling applied to the supply airstream by one or more cooling stages. A feed-forward module manages disturbances caused by adding or shedding cooling stages by applying a feed-forward gain to the supply air fan setpoint.

14 Claims, 9 Drawing Sheets

| 700 | | State Outputs | | | | | |
|---|---|---|---|---|---|---|---|
| | | Zone Temperature Controller 504 | Fan Controller 512 | Cooling Controller 508 | Supply Air Fan 86 | Supply Air Setpoint $T_{sa,sp}$ | Cooling Stages 83 |
| States | Heating Required 608 | Off | Off | Off | Fixed at Maxumum Speed | N/A | Off |
| | No Heating or Cooling Required 610 | Off | Off | Off | Fixed at Minimum Speed | N/A | Off |
| | Low Cooling Load 614 | On | Off | On | Fixed at Minimum Speed | Modulated by Zone Temperature Controller 504 | Modulated by Cooling Controller 508 |
| | High Cooling Load 616 | Off | On | On | Modulated by Fan Controller 512 | Fixed Value | Modulated by Cooling Controller 508 |
| | Temperature Unreliable 606 | Off | Off | Off | N/A | N/A | Off |

(56) References Cited

U.S. PATENT DOCUMENTS

| | | |
|---|---|---|
| 5,447,037 A | 9/1995 | Bishop et al. |
| 5,474,087 A | 12/1995 | Nashner |
| 5,533,348 A | 7/1996 | Baldwin et al. |
| 5,823,004 A | 10/1998 | Polley et al. |
| 6,374,631 B1 | 4/2002 | Lifson et al. |
| 6,434,960 B1 | 8/2002 | Rousseau |
| 6,532,754 B2 | 3/2003 | Haley et al. |
| 6,540,148 B1 * | 4/2003 | Salsbury ............ F04B 41/06 165/256 |
| 6,644,049 B2 | 11/2003 | Alford |
| 6,701,723 B1 | 3/2004 | Dobmeier et al. |
| 6,820,434 B1 | 11/2004 | Gutheim et al. |
| 6,857,578 B2 | 2/2005 | Alvarez et al. |
| 6,919,809 B2 | 7/2005 | Blunn et al. |
| 7,100,382 B2 | 9/2006 | Butler et al. |
| RE39,597 E | 5/2007 | Rousseau |
| 7,225,054 B2 | 5/2007 | Amundson et al. |
| 7,228,707 B2 | 6/2007 | Lifson et al. |
| 7,243,004 B2 | 7/2007 | Shah et al. |
| 7,257,958 B2 | 8/2007 | Bush et al. |
| 7,383,158 B2 | 6/2008 | Krocker et al. |
| 7,389,159 B2 | 6/2008 | Warren et al. |
| 7,455,238 B2 | 11/2008 | Hugghins |
| 7,590,469 B2 * | 9/2009 | Grohman ............ G05B 13/02 236/44 C |
| 7,600,694 B2 | 10/2009 | Helt et al. |
| 7,650,206 B2 | 1/2010 | Hudson |
| 7,748,225 B2 | 7/2010 | Butler et al. |
| 7,775,452 B2 | 8/2010 | Shah et al. |
| 7,793,513 B2 | 9/2010 | Aldridge et al. |
| 7,821,218 B2 | 10/2010 | Butler et al. |
| 7,837,128 B2 | 11/2010 | Helt et al. |
| 7,840,311 B2 | 11/2010 | Grohman |
| 7,844,764 B2 | 11/2010 | Williams |
| 7,913,501 B2 | 3/2011 | Ellis et al. |
| 7,966,838 B2 | 6/2011 | Lifson et al. |
| 7,975,494 B2 | 7/2011 | Boydstun et al. |
| 7,997,091 B2 | 8/2011 | Lifson et al. |
| 7,997,092 B2 | 8/2011 | Lifson et al. |
| 8,260,444 B2 * | 9/2012 | Kowald ............ F24F 11/006 236/76 |
| 2005/0155367 A1 * | 7/2005 | Shah ............ F24F 13/02 62/186 |
| 2006/0273183 A1 | 12/2006 | Cavanagh et al. |
| 2008/0054082 A1 | 3/2008 | Evans et al. |
| 2009/0113900 A1 | 5/2009 | Lifson et al. |
| 2009/0222139 A1 * | 9/2009 | Federspiel ............ F24F 11/006 700/278 |
| 2010/0071391 A1 | 3/2010 | Lifson et al. |
| 2010/0082161 A1 * | 4/2010 | Patch ............ F24F 11/0001 700/276 |
| 2010/0106319 A1 | 4/2010 | Grohman et al. |
| 2010/0125368 A1 | 5/2010 | Bailey et al. |
| 2010/0250009 A1 | 9/2010 | Lifson et al. |
| 2010/0269521 A1 * | 10/2010 | Moore ............ F24F 3/1405 62/91 |
| 2010/0286799 A1 | 11/2010 | Matsen et al. |
| 2010/0298981 A1 | 11/2010 | Chamorro et al. |
| 2010/0298982 A1 | 11/2010 | Chamorro et al. |
| 2010/0298983 A1 | 11/2010 | Beste et al. |
| 2010/0298984 A1 | 11/2010 | Mauk et al. |
| 2010/0298985 A1 | 11/2010 | Hess et al. |
| 2010/0298986 A1 | 11/2010 | Stachler |
| 2010/0298987 A1 | 11/2010 | Bennett et al. |
| 2010/0298988 A1 | 11/2010 | Stachler et al. |
| 2010/0298989 A1 | 11/2010 | Hess et al. |
| 2010/0299563 A1 | 11/2010 | Stachler |
| 2011/0097988 A1 * | 4/2011 | Lord ............ F24F 11/0079 454/256 |
| 2011/0138827 A1 | 6/2011 | Lifson et al. |
| 2011/0202180 A1 | 8/2011 | Kowald et al. |
| 2012/0016526 A1 * | 1/2012 | Burton ............ F24F 11/0012 700/278 |
| 2014/0131009 A1 * | 5/2014 | Zhou ............ F28F 27/00 165/104.14 |

* cited by examiner

| | State Outputs | | | | | |
|---|---|---|---|---|---|---|
| States | Zone Temperature Controller 504 | Fan Controller 512 | Cooling Controller 508 | Supply Air Fan 86 | Supply Air Setpoint $T_{sa,sp}$ | Cooling Stages 83 |
| Heating Required 608 | Off | Off | Off | Fixed at Maxumum Speed | N/A | Off |
| No Heating or Cooling Required 610 | Off | Off | Off | Fixed at Minimum Speed | N/A | Off |
| Low Cooling Load 614 | On | Off | On | Fixed at Minimum Speed | Modulated by Zone Temperature Controller 504 | Modulated by Cooling Controller 508 |
| High Cooling Load 616 | Off | On | On | Modulated by Fan Controller 512 | Fixed Value | Modulated by Cooling Controller 508 |
| Temperature Unreliable 606 | Off | Off | Off | N/A | N/A | Off |

STATE-BASED CONTROL IN AN AIR HANDLING UNIT

BACKGROUND

The present invention relates generally to heating, ventilating, and air conditioning (HVAC) systems and more specifically to a state-based control system for an air handling unit (AHU) in a building HVAC system.

HVAC systems are used to monitor and control temperature, humidity, air flow, air quality, and other conditions in a building or building system. HVAC systems often include an AHU which functions intake outside air and/or return air from inside the building and to provide a supply airstream to the building at setpoint conditions. Some AHUs use a constant volume fan to provide a constant airflow directly to one or more building zones. Other AHUs use a variable volume fan and/or provide airflow to downstream variable air volume (VAV) boxes which control airflow into the building zone.

Typically, AHUs are designed to serve a heating or cooling load within a predetermined load range and must sacrifice energy efficiency to provide heating or cooling outside the predetermined range. Many AHUs also rely on downstream pressure sensors (e.g., static pressure sensors, velocity pressure sensors, etc.) or input from other control loops to achieve setpoint conditions. It would be desirable to provide an AHU that is adaptable to multiple different load conditions without sacrificing efficiency.

SUMMARY

One implementation of the present disclosure is a control system for an air handling unit (AHU) in a building HVAC system. The control system includes a supply air fan configured to provide a supply airstream to a building zone, one or more cooling stages configured to chill the supply airstream, a supply air temperature sensor configured to measure a temperature of the supply airstream downstream of the cooling stages, a zone temperature sensor configured to measure a temperature of the building zone, and a controller configured to operate the supply air fan and the cooling stages based on input from the supply air temperature sensor and the zone temperature sensor. The controller includes a finite state module configured to cause the controller to transition between a high cooling load state and a low cooling load state. In the high cooling load state, the controller maintains the supply air temperature at a fixed setpoint and controls the zone temperature by modulating a speed of the supply air fan. In the low cooling load state, the controller operates the supply air fan at a fixed speed and controls the zone temperature by modulating an amount of cooling provided to the supply air stream by the cooling stages.

In some embodiments, the controller includes a zone temperature control module configured to determine a setpoint for the supply air temperature based on the temperature of the building zone when the controller is operating in the low cooling load state. The controller may further include a cooling control module configured to modulate the amount of cooling provided to the supply airstream by the cooling stages to achieve the setpoint for the supply air temperature. In some embodiments, the zone temperature control module is part of an outer cascaded control loop and the cooling control module is part of an inner cascaded control loop. The finite state module may be configured to identify a saturation status for the zone temperature control module when the controller is operating in the low cooling load state. The finite state module may cause the controller to transition from the low cooling load state into the high cooling load state in response to the saturation status for the zone temperature control module being greater than or equal to a threshold value.

In some embodiments, the controller includes a fan control module configured to modulate the speed of the supply air fan based on the temperature of the building zone when the controller is operating in the high cooling load state. The finite state module may be configured to identify a saturation status for the fan control module when the controller is operating in the high cooling load state. The finite state module may cause the controller to transition from the high cooling load state into the low cooling load state in response to the saturation status for the fan control module being less than or equal to a threshold value.

In some embodiments, the controller includes a feed-forward module configured to detect a change in a number of active cooling stages, calculate a feed-forward gain for the speed of the supply air fan in response to detecting the change in the number of active cooling stages, and adjust the speed of the supply air fan in accordance with the calculated feed-forward gain. In some embodiments, calculating the feed-forward gain includes determining a gain for the speed of the supply air fan that causes an amount of cooling provided to the building zone after the change in the number of active stages to be equivalent to an amount of cooling provided to the building zone before the change in the number of active stages.

In some embodiments, calculating the feed-forward gain includes determining a first difference between a temperature of the supply air before the change in the number of active stages and a setpoint temperature for the building zone, determining a second difference between a temperature of the supply air after the change in the number of active stages and the setpoint temperature for the building zone, and using a ratio between the first difference and the second difference as the feed-forward gain.

Another implementation of the present disclosure is a control system for an air handling unit (AHU) in a building HVAC system. The control system includes a fan control loop and a cooling control loop. The fan control loop includes a supply air fan configured to provide a supply airstream to a building zone, a zone temperature sensor configured to measure a temperature of the building zone, and a fan controller configured to modulate a speed of the supply air fan based on the measured temperature of the building zone to achieve a temperature setpoint for the building zone. The cooling control loop includes one or more cooling stages configured to chill the supply airstream, a zone temperature controller configured to determine a temperature setpoint for the supply airstream based the measured temperature of the building zone, and a cooling controller configured to modulate an amount of cooling provided to the supply airstream by the cooling stages to achieve the temperature setpoint for the supply airstream. In some embodiments, the cooling control loop is a cascaded control loop.

In some embodiments, the control system includes a finite state controller configured to cause the control system to transition between a high cooling load state and a low cooling load state. In the high cooling load state, the cooling control loop may maintain the temperature of the supply airstream at a fixed setpoint and the fan control loop may control the temperature of the building zone by modulating the speed of the supply air fan. In the low cooling load state, the fan control loop may operate the supply air fan at a fixed speed and the cooling control loop may control the temperature of the building zone by modulating an amount of cooling provided to the supply air stream by the cooling stages.

In some embodiments, the finite state controller is configured to identify a saturation status for the cooling control loop when the control system is operating in the low cooling load state and cause the control system to transition from the low cooling load state into the high cooling load state in response to the saturation status for the cooling control loop being greater than or equal to a threshold value. In some embodiments, the finite state controller is configured to identify a saturation status for the fan control loop when the control system is operating in the high cooling load state and cause the control system to transition from the high cooling load state into the low cooling load state in response to the saturation status for the fan control loop being less than or equal to a threshold value.

In some embodiments, the control system includes a feed-forward controller configured to detect a change in a number of active cooling stages calculate a feed-forward gain for the speed of the supply air fan in response to detecting the change in the number of active cooling stages, and adjust the speed of the supply air fan in accordance with the calculated feed-forward gain. Calculating the feed-forward gain may include determining a first difference between a temperature of the supply air before the change in the number of active stages and the setpoint temperature for the building zone, determining a second difference between a temperature of the supply air after the change in the number of active stages and the setpoint temperature for the building zone, and using a ratio between the first difference and the second difference as the feed-forward gain.

Another implementation of the present disclosure is a method for operating an air handling unit (AHU) in a building HVAC system. The method includes using a supply air fan to provide a supply airstream to a building zone and using one or more cooling stages to chill the supply airstream. The method further includes receiving, at a controller, a measured temperature of the supply airstream downstream of the cooling stages and a measured temperature of the building zone. The method further includes operating, by the controller, the AHU in a high cooling load state in which the controller maintains the temperature of the supply airstream at a fixed setpoint and controls the temperature of the building zone by modulating a speed of the supply air fan. The method further includes operating, by the controller, the AHU in a low cooling load state in which the controller operates the supply air fan at a fixed speed and controls the temperature of the building zone by modulating an amount of cooling provided to the supply air stream by the cooling stages. The method further includes causing, by the controller, a transition between the high cooling load state and the low cooling load state based on a saturation status of the controller.

In some embodiments, operating the AHU in the low cooling load state includes using a cooling control loop to determine a setpoint temperature for the supply airstream based on the temperature of the building zone and modulate the amount of cooling provided to the supply airstream by the cooling stages to achieve the setpoint temperature for the supply airstream. In some embodiments, the cooling control loop is a cascaded control loop. Causing the transition between the high cooling load state and the low cooling load state may include identifying a saturation status of the cooling control loop and causing the controller to transition from the low cooling load state into the high cooling load state in response to the saturation status for the cooling control loop being greater than or equal to a threshold value.

In some embodiments, operating the AHU in the high cooling load state includes using a fan control loop to modulate the speed of the supply air fan based on the temperature of the building zone. Causing the transition between the high cooling load state and the low cooling load state may include identifying a saturation status of the fan control loop and causing the controller to transition from the high cooling load state into the low cooling load state in response to the saturation status for the fan control loop being less than or equal to a threshold value.

In some embodiments, the method includes detecting a change in a number of active cooling stages, calculating a feed-forward gain for the speed of the supply air fan in response to detecting the change in the number of active cooling stages, and adjusting the speed of the supply air fan in accordance with the calculated feed-forward gain. Calculating the feed-forward gain may include determining a first difference between a temperature of the supply air before the change in the number of active stages and the setpoint temperature for the building zone, determining a second difference between a temperature of the supply air after the change in the number of active stages and the setpoint temperature for the building zone, and using a ratio between the first difference and the second difference as the feed-forward gain.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 7 is a chart illustrating the functions performed by a zone temperature controller, a cooling controller, and a fan controller of the state-based control system of FIG. 5 in several of the operating states shown in FIG. 6, according to an exemplary embodiment.

DETAILED DESCRIPTION

Figure 1:
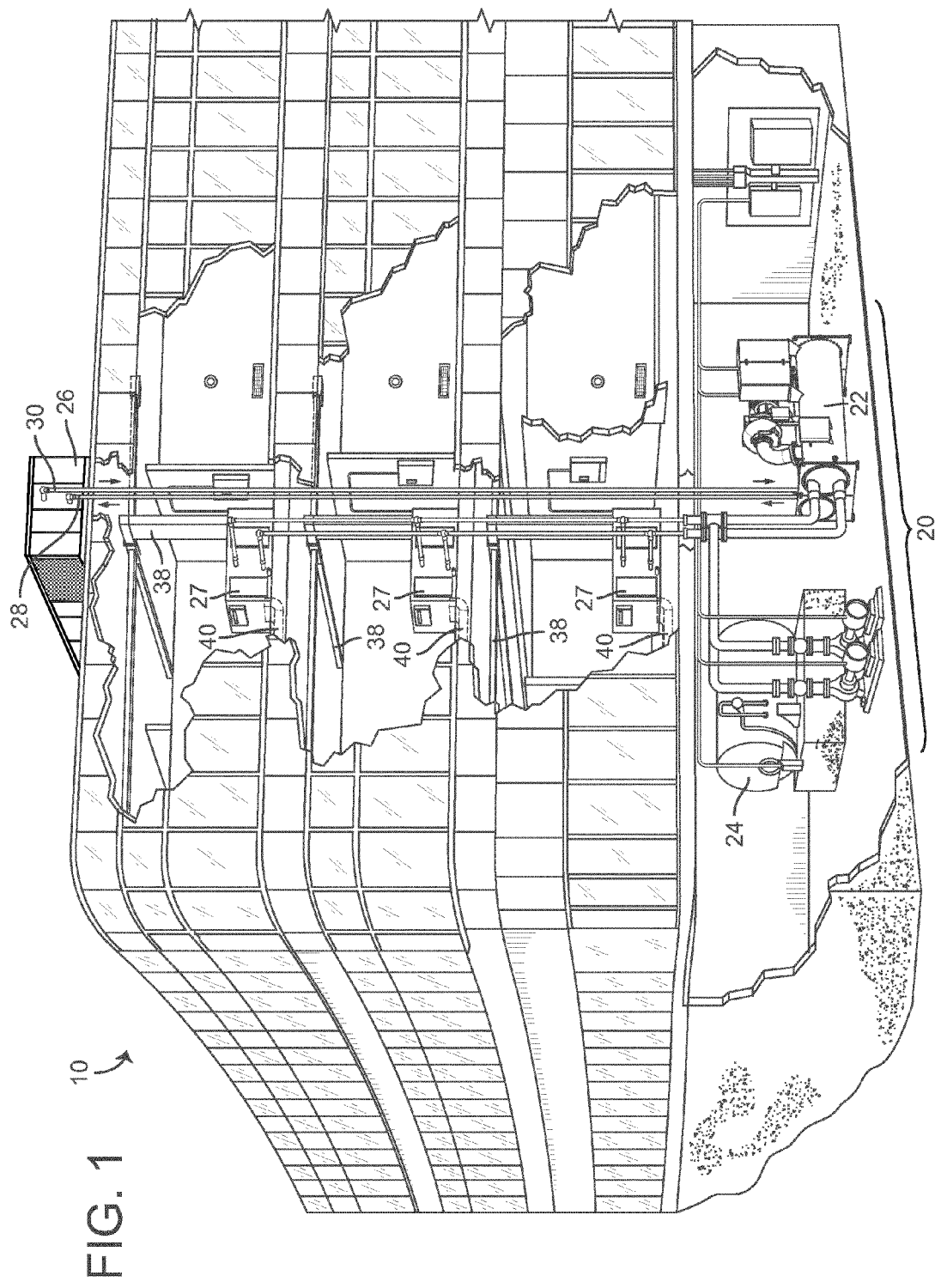
FIG. 1 is a drawing of a building equipped with a heating, ventilating, and air conditioning (HVAC) system including an air handling unit (AHU) that provides air to one or more zones of the building, according to an exemplary embodiment.

Referring generally to the FIGURES, systems and methods for operating an air handling unit (AHU) in a building heating, ventilating, and air conditioning (HVAC) system are shown, according to various exemplary embodiments. The systems and methods described herein implement a state-based technique to control the temperature of a building zone $T_{zone}$ by modulating a supply fan and one or more states of heating or cooling. One implementation of the present disclosure is a state-based control system that has multiple operating states or modes and can transition between the various operating states based on the heating or cooling demand from the building zone. Although the systems and methods of the present disclosure are described primarily with reference to cooling systems, it is understood that the same or similar control techniques can readily be applied to heating systems, humidity control systems, air quality control systems, or other types of control systems for use in controlling any variable state or condition in a building or other controlled environment.

In some embodiments, the state-based control system includes a finite state machine configured to cause a transition between a high cooling load state and a low cooling load state. In the high cooling load state, the system may maintain the temperature of a supply airstream $T_{sa}$ at a fixed setpoint and control the temperature of the building zone $T_{zone}$ by modulating the speed of a supply air fan. In the low cooling load state, the system may operate the supply air fan at a fixed speed and control the temperature of the building zone $T_{zone}$ by modulating an amount of cooling applied to the supply airstream by one or more cooling stages.

The state-based control system may include a fan control loop configured to modulate the speed of the supply air fan and a cooling control loop configured to modulate the amount of cooling applied by the one or more cooling stages. In some embodiments, the cooling control loop is a cascaded control loop. An outer loop of the cascaded control loop may determine a setpoint supply air temperature $T_{sa,sp}$ based on a measured temperature of the building zone $T_{zone}$ and a zone temperature setpoint $T_{zone,sp}$. An inner loop of the cascaded control loop may use the setpoint supply air temperature $T_{sa,sp}$ from the outer loop to modulate the amount of cooling applied to the supply airstream.

Transitions between the low cooling load state and the high cooling load state may be based on the saturation status of the fan control loop and/or the cooling control loop. For example, when the system is operating in the low cooling load state, the finite state machine may monitor a saturation status of the cooling control loop. If the saturation status of the control loop is greater than or equal to a threshold value, the finite state machine may cause a transition into the high cooling load state. When the system is operating in the high cooling load state, the finite state machine may monitor a saturation status of the fan control loop. If the saturation status of the fan loop is less than or equal to a threshold value, the finite state machine may cause a transition into the low cooling load state.

In some embodiments, the fan control loop includes a feed-forward module configured to calculate and apply a feed-forward gain to the supply air fan setpoint $S_{fan}$. Advantageously, the feed-forward gain allows the state-based control system to anticipate and manage disturbances caused by adding or shedding cooling stages before such disturbances are detected as fluctuations in the building zone temperature $T_{zone}$. For example, the feed-forward module may calculate a feed-forward gain that causes an amount of cooling provided to the building zone after the change in the number of active cooling stages to be equivalent or substantially equivalent to the amount of cooling provided to the building zone before the change in the active number of cooling stages. The feed-forward gain may be applied to the supply air fan setpoint $S_{fan}$ to calculate an adjusted setpoint $S_{fan,adj}$ for the supply air fan. These and other advantages of the systems and methods of the present disclosure are described in greater detail in the following paragraphs.

Referring now to FIG. 1, a perspective view of a building 10 is shown. Building 10 is serviced by HVAC system 20. HVAC system 20 is shown to include a chiller 22, a boiler 24, and a rooftop air handling unit (AHU) 26. HVAC system 20 uses a fluid circulation system to provide heating and/or cooling for building 10. The circulated fluid (e.g., water, glycol, etc.) may be cooled in chiller 22 or heated in boiler 24, depending on whether cooling or heating is required in building 10. Boiler 24 may add heat to the circulated fluid, for example, by burning a combustible material (e.g., natural gas). Chiller 22 may place the circulated fluid in a heat exchange relationship with another fluid (e.g., a refrigerant) in a heat exchanger (e.g., an evaporator) to absorb heat from the circulated fluid. The circulated fluid from chiller 22 or boiler 24 may be transported to AHU 26 via piping 28. AHU 26 may place the circulated fluid in a heat exchange relationship with an airflow passing through AHU 26 (e.g., via one or more stages of cooling coils and/or heating coils). The airflow may be, for example, outside air, return air from within building 10, or a combination of both. AHU 26 may transfer heat between the airflow and the circulated fluid to provide heating or cooling for the airflow. For example, AHU 26 may include one or more fans or blowers configured to pass the airflow over or through a heat exchanger containing the circulated fluid. The circulated fluid may then return to chiller 22 or boiler 24 via piping 30.

The airflow supplied by AHU 26 (i.e., the supply airflow) may be delivered to building 10 via an air distribution system including air supply ducts 38 and may return to AHU 26 from building 10 via air return ducts 40. In some embodiments, building 10 includes a plurality variable air volume (VAV) units 27. For example, HVAC system 20 is shown to include a separate VAV unit 27 on each floor or zone of building 10. VAV units 27 may include dampers or other flow control elements which can be operated to control an amount of the supply airflow provided to individual zones of building 10. In other embodiments, AHU 26 delivers the supply airflow into one or more zones of building 10 (e.g., via supply ducts 38) without requiring intermediate flow control elements. AHU 26 may include various sensors (e.g., temperature sensors, pressure sensors, etc.) configured to measure attributes of the supply airflow. AHU 26 may also receive input from sensors located within the building zone and may adjust the flow rate and/or temperature of the supply airflow through AHU 26 to achieve setpoint conditions for the building zone.

Figure 2:
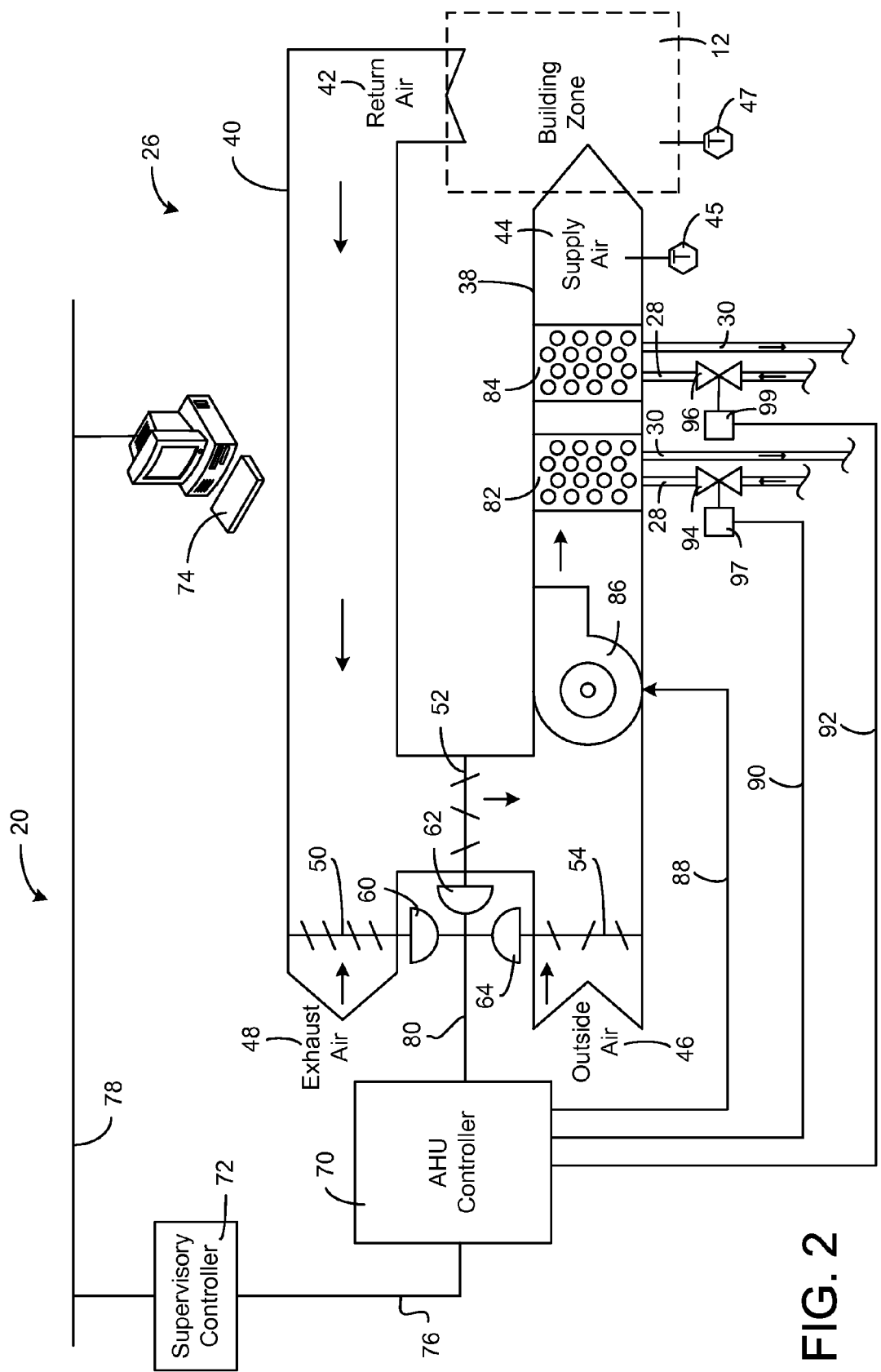
FIG. 2 is a block diagram illustrating the AHU of FIG. 1 in greater detail, according to an exemplary embodiment.

Referring now to FIG. 2, a block diagram illustrating AHU 26 in greater detail is shown, according to an exemplary embodiment. AHU 26 is shown as an economizer-type air handling unit. Economizer-type air handling units vary the amount of outside air and return air used by the air handling unit for heating or cooling. For example, AHU 26 may receive return air 42 from building zone 12 via return air duct 40 and may deliver supply air 44 to building zone 12 via supply air duct 38. In some embodiments, AHU 26 is a rooftop unit and may be located on the roof of building 10 (e.g., as shown in FIG. 1) or otherwise positioned to receive return air 42 and outside air 46. AHU 26 may be configured to operate exhaust air damper 50, mixing damper 52, and outside air damper 54 to control an amount of outside air 46 and return air 42 that combine to form supply air 44. Any return air 42 that does not pass through mixing damper 52 may be exhausted from AHU 26 through exhaust damper 50 as exhaust air 48.

Each of dampers 50-54 may be operated by an actuator. As shown in FIG. 2, exhaust air damper 50 may be operated by actuator 60, mixing damper 52 may be operated by actuator 62, and outside air damper 54 may be operated by actuator 64. Actuators 60-64 may communicate with an AHU controller 70 via a communications link 80. Actuators 60-64 may receive control signals from AHU controller 70 and may provide feedback signals to AHU controller 70. Feedback signals may include, for example, an indication of a current actuator or damper position, an amount of torque or force exerted by the actuator, diagnostic information (e.g., results of diagnostic tests performed by actuators 60-64), status information, commissioning information, configuration settings, calibration data, and/or other types of information or data that may be collected, stored, or used by actuators 60-64. AHU controller 70 may be an economizer controller configured to use one or more control algorithms (e.g., state-based algorithms, ESC algorithms, PID control algorithms, model predictive control algorithms, feedback control algorithms, etc.) to control actuators 60-64. Several exemplary controllers that may be used as AHU controller 70 are described in greater detail with reference to FIGS. 3-6.

Still referring to FIG. 2, AHU 26 is shown to include a cooling coil 82, a heating coil 84, and a fan 86 positioned within supply air duct 38. Fan 86 may be configured to force supply air 44 through cooling coil 82 and/or heating coil 84 and provide supply air 44 to building zone 12. AHU controller 70 may communicate with fan 86 via communications link 88 to control a flow rate of supply air 44. In some embodiments, AHU controller 70 controls an amount of heating or cooling applied to supply air 44 by modulating a speed of fan 86. Cooling coil 82 may receive a chilled fluid from chiller 22 via piping 28 and may return the chilled fluid to chiller 22 via piping 30. Valve 94 may be positioned along piping 28 or piping 30 to control an amount of the chilled fluid provided to cooling coil 82. In some embodiments, cooling coil 82 includes multiple stages of cooling coils that can be independently activated and deactivated (e.g., by AHU controller 70) to modulate an amount of cooling applied to supply air 44. Heating coil 84 may receive a heated fluid from boiler 24 via piping 28 and may return the heated fluid to boiler 24 via piping 30. Valve 96 may be positioned along piping 28 or piping 30 to control an amount of the heated fluid provided to heating coil 84. In some embodiments, heating coil 84 includes multiple stages of heating coils that can be independently activated and deactivated to modulate an amount of heating applied to supply air 44.

Each of valves 94-96 may be controlled by an actuator. As shown in FIG. 2, valve 94 may be controlled by actuator 97 and valve 96 may be controlled by actuator 99. Actuators 97-99 may communicate with AHU controller 70 via communications links 90-92. Actuators 97-99 may receive control signals from AHU controller 70 and may provide feedback signals to controller 70. In some embodiments, AHU controller 70 receives a measurement of the supply air temperature from a temperature sensor 45 positioned in supply air duct 38 (e.g., downstream of cooling coil 82 and/or heating coil 84). AHU controller 70 may also receive a measurement of the temperature of building zone 12 from a temperature sensor 47 located in building zone 12.

In some embodiments, AHU controller 70 operates valves 94-96 via actuators 97-99 to modulate an amount of heating or cooling provided to supply air 44 (e.g., to achieve a setpoint temperature for supply air 44 or to maintain the temperature of supply air 102 within a setpoint temperature range). The positions of valves 97-99 affect the amount of heating or cooling provided to supply air 44 by cooling coil 82 or heating coil 84 and may correlate with the amount of energy consumed to achieve a desired supply air temperature. AHU 70 may control the temperature of supply air 44 and/or building zone 12 by activating or deactivating coils 82-84, adjusting a speed of fan 86, or a combination of both.

In some embodiments, AHU controller 70 executes a state-based control algorithm to control the temperature of building zone 12. For example, AHU controller 70 may include a finite state machine configured to cause AHU controller 70 to transition between a high cooling load state and a low cooling load state. In the high cooling load state, AHU controller 70 may maintain the temperature of supply air 44 at a fixed setpoint and control the temperature of building zone 12 by modulating a speed of supply air fan 86. In the low cooling load state, AHU controller 70 may operate supply air fan 86 at a fixed speed and control the temperature of building zone 12 by modulating an amount of cooling provided to supply air 44 by the cooling coils 82. The state-based control algorithm is described in greater detail with reference to FIGS. 5-7.

Still referring to FIG. 2, HVAC system 20 is shown to include a supervisory controller 72 and a client device 74. Supervisory controller 72 may include one or more computer systems (e.g., servers, BAS controllers, etc.) that serve as system level controllers, application or data servers, head nodes, master controllers, or field controllers for HVAC system 20. Supervisory controller 72 may communicate with multiple downstream building systems or subsystems (e.g., an HVAC system, a security system, etc.) via a communications link 76 according to like or disparate protocols (e.g., LON, BACnet, etc.).

In some embodiments, AHU controller 70 receives information (e.g., commands, setpoints, operating boundaries, etc.) from supervisory controller 72. For example, supervisory controller 72 may provide AHU controller 70 with a high fan speed limit and a low fan speed limit. A low limit may avoid frequent component and power taxing fan start-ups while a high limit may avoid operation near the mechanical or thermal limits of the fan system. In various embodiments, AHU controller 70 and supervisory controller 72 may be separate (as shown in FIG. 2) or integrated. In an integrated implementation, AHU controller 70 may be a software module configured for execution by a processor of supervisory controller 72.

Client device 74 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, its subsystems, and/or devices. Client device 74 may be a computer workstation, a client terminal, a remote or local interface, or any other type of user interface device. Client device 74 may be a stationary terminal or a mobile device. For example, client device 74 may be a desktop computer, a computer server with a user interface, a laptop computer, a tablet, a smartphone, a PDA, or any other type of mobile or non-mobile device. Client device 74 may communicate with supervisory controller 72 and/or AHU controller 70 via communications link 78.

Figure 3:
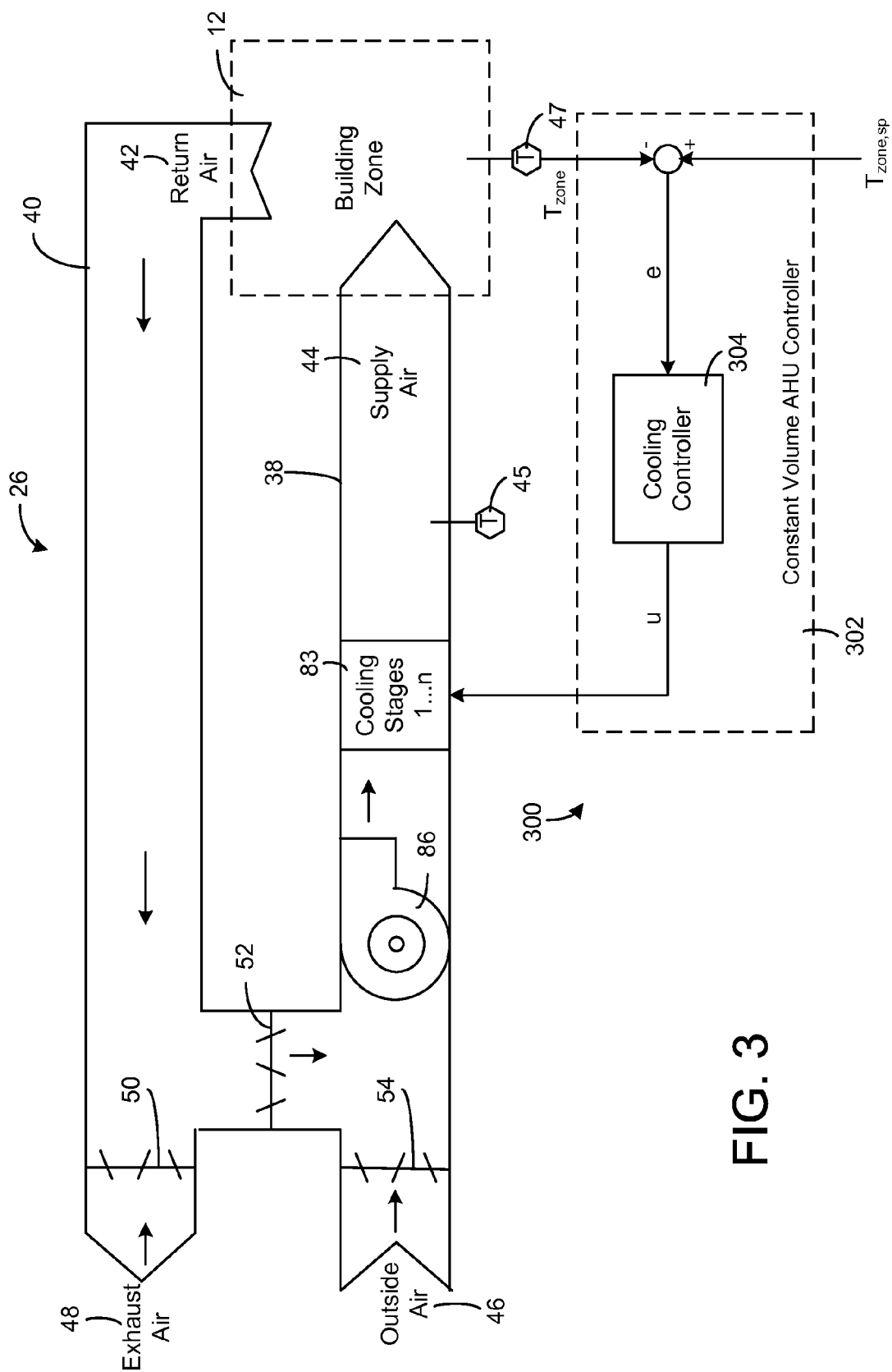
FIG. 3 is a block diagram of a constant volume control system which may be used in conjunction with the AHU of FIG. 1, according to an exemplary embodiment.

Referring now to FIG. 3, a block diagram of a constant volume (CV) control system 300 that may be used in conjunction with AHU 26 is shown, according to an exemplary embodiment. CV control system 300 is shown to include supply air fan 86, a plurality of cooling stages 83, and a constant volume AHU controller 302. In CV control system 300, supply air fan 86 may be operated at a constant speed such that the flow rate of supply air 44 is constant or substantially constant (i.e., a constant flow volume). Constant volume AHU controller 302 may be configured to control the temperature of supply air 44 (and consequently the temperature of building zone 12) by activating or deactivating various stages of cooling stages 83. Cooling stages 83 may include, for example, one or more stages of cooling devices (e.g., cooling coils, evaporators, chillers, etc.) that can be independently activated and deactivated by cooling controller 304 to modulate an amount of cooling applied to supply air 44. In some embodiments, CV control system 300 includes one or more heating stages in addition to or in place of cooling stages 83.

Still referring to FIG. 3, cooling controller 304 is shown receiving a zone temperature setpoint $T_{zone,sp}$ indicating a desired temperature or acceptable temperature range for building zone 12. The zone temperature setpoint $T_{zone,sp}$ may be received, for example, from a supervisory controller, from a client device, or any other data source. Cooling controller 304 is also shown receiving a temperature input $T_{zone}$ from a temperature sensor 47 positioned to measure the temperature within building zone 12. Cooling controller 304 may compare the measured temperature $T_{zone}$ with the setpoint temperature $T_{zone,sp}$ to generate an error signal e (e.g., $e=T_{zone,sp}-T_{zone}$). Based on the value of error signal e, cooling controller 304 may activate or deactivate various stages of cooling stages 83 such that error signal e is minimized. Cooling controller 304 may use any type of control methodology (e.g., proportional control, proportional-integral (PI) control, proportional-integral-derivative (PID) control, model predictive control, other types of feedback control, etc.) to determine a control signal u for cooling stages 83 based on the value of error signal e.

In CV control system 300, cooling controller 304 may activate a lesser number of cooling stages 83 during low load conditions and a greater number of cooling stages 83 during high load conditions. When fewer of cooling stages 83 are active, the temperature of supply air 44 may increase, thereby providing less latent cooling to building zone 12. Supply air fan 86 may continuously move the same volume of supply air 44 in CV control system 300. Accordingly, the control methodology used in CV control system 300 may cause supply air fan 86 to consume the same amount of energy regardless of load conditions.

Figure 4:
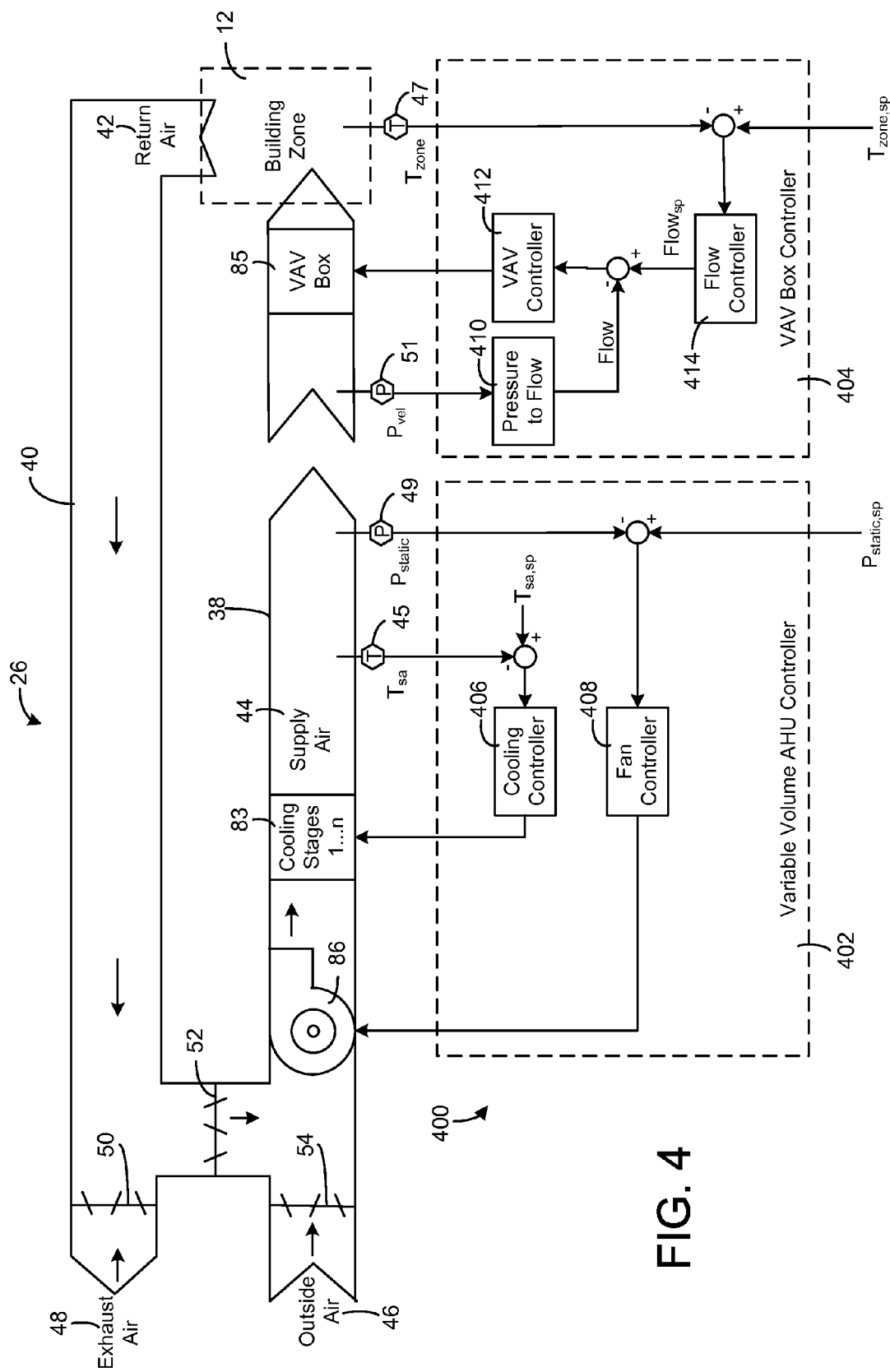
FIG. 4 is a block diagram of a variable volume control system which may be used in conjunction with the AHU of FIG. 1, according to an exemplary embodiment.

Referring now to FIG. 4, a block diagram of a variable volume (VV) control system 400 that may be used in conjunction with AHU 26 is shown, according to an exemplary embodiment. In VV control system 400, the flow of supply air 44 to building zone 12 is controlled by both a variable volume AHU controller 402 and a variable air volume (VAV) box controller 404. Variable volume AHU controller 402 may be used to control operation of AHU 26 and provide supply air 44 to a downstream VAV box 85. VAV box 85 may include, for example, one or more dampers or other flow control elements configured to control the flow of supply air 44 into building zone 12. VAV box controller 404 may operate VAV box 85 to modulate the flow of supply air 44 into building zone 12.

Variable volume AHU controller 402 is shown to include two separate control loops. In the first control loop, cooling controller 406 receives a supply air temperature setpoint $T_{sa,sp}$ indicating the desired temperature or acceptable temperature range for the temperature of supply air 44. The supply air temperature setpoint $T_{sa,sp}$ may be received, for example, from a supervisory controller, from a client device, or any other data source. Cooling controller 406 may also receive a temperature input $T_{sa}$ from a temperature sensor 45 positioned to measure the temperature of supply air 44. Cooling controller 406 may compare the measured temperature $T_{sa}$ with the setpoint temperature $T_{sa,sp}$ to generate a control signal for cooling stages 83. For example, cooling controller 404 may activate or deactivate various stages of cooling stages 83 to control the supply air temperature $T_{sa}$ to the supply air temperature setpoint $T_{sa,sp}$.

In the second control loop, fan controller 408 receives a duct static pressure setpoint $P_{static,sp}$ indicating the desired static pressure of supply air 44 in supply air duct 38. The duct static pressure setpoint $P_{static,sp}$ may be received, for example, from a supervisory controller, from a client device, or any other data source. Fan controller 408 may also receive a pressure input $P_{static}$ from a pressure sensor 49 positioned to measure the static pressure of supply air 44 in duct 38. Fan controller 408 may compare the measured pressure $P_{static}$ with the static pressure setpoint $P_{static,sp}$ to generate a control signal for supply air fan 86. For example, fan controller 408 may increase or decrease the speed of fan 86 to control the supply air static pressure $P_{static}$ to the supply air pressure setpoint $P_{static,sp}$. Supply air 44 is then delivered via supply air duct 38 to VAV box 85 at the temperature and pressure conditions controlled by variable volume AHU controller 402.

Still referring to FIG. 4, VAV box controller 404 may operate VAV box 85 to modulate the flow of supply air 44 into building zone 12. VAV box controller 404 may use a cascaded control scheme to control the temperature of building zone 12 and to ensure a minimum volume of supply air 44 entering building zone 12. The outer loop of the cascaded control scheme is shown to include a flow controller 414 that receives a zone temperature setpoint $T_{zone,sp}$ indicating a desired temperature or acceptable temperature range for building zone 12. The zone temperature setpoint $T_{zone,sp}$ may be received, for example, from a supervisory controller, from a client device, or any other data source. Flow controller 414 may also receive a temperature input $T_{zone}$ from a temperature sensor 47 positioned to measure the temperature within building zone 12. Flow controller 414 compares the zone temperature setpoint $T_{zone,sp}$ with the temperature of building zone 12 $T_{zone}$ to determine a flow setpoint $Flow_{sp}$ for VAV controller 412. For example, if the measured zone temperature $T_{zone}$ is greater than the zone temperature setpoint $T_{zone,sp}$, flow controller 414 may increase the flow setpoint $Flow_{sp}$ to cause more supply air 44 to enter building zone 12, thereby increasing the cooling provided to building zone 12 and decreasing the measured temperature $T_{zone}$.

The inner loop of the cascaded control scheme is shown to include a pressure-to-flow converter 410 and a VAV controller 412. Pressure-to-flow converter 410 may be configured to receive velocity pressure input $P_{vel}$ from a pressure sensor 51 positioned to measure the velocity pressure of supply air 44 received at VAV box 85. Pressure-to-flow converter 410 may convert the measured velocity pressure $P_{vel}$ into an airflow rate Flow and provide the flow rate Flow to VAV controller 412. VAV controller 412 may compare the flow setpoint $Flow_{sp}$ with the actual flow rate Flow of supply air 44 to generate a control signal for VAV box 85 such that the actual flow rate Flow is controlled to the flow rate setpoint $Flow_{sp}$.

Still referring to FIG. 4, the control operations performed by variable volume AHU controller 402 and VAV box controller 404 may be coupled together in VV control system 400. For example, as VAV box 85 opens to allow more airflow into building zone 12, the static pressure in duct 38 may decrease. Such a decrease in static pressure represents an increase in load. Variable volume AHU controller 402 may respond to the increase in load by increasing the speed of supply air fan 86 to maintain the measured duct static pressure $P_{static}$ at the duct static pressure setpoint $P_{static,sp}$ and/or activating additional stages of cooling stages 83 to maintain the measured temperature $T_{sa}$ of supply air 44 at the supply air temperature setpoint $T_{sa,sp}$.

Unlike CV control system 300, VV control system 400 modulates the speed of supply air fan 86 as the load changes and the temperature of supply air 44 is controlled to a relatively constant temperature (i.e., the supply air temperature setpoint $T_{sa,sp}$). The performance of VV control system 400 in controlling the supply air temperature $T_{sa}$ may depend on the particular configuration of variable volume AHU controller 402 (e.g., staged cooling or proportional control, the number of cooling stages 83, etc.). In some embodiments, VV control system 400 controls the supply air temperature $T_{sa}$ to a relatively lower setpoint than CV control system 300, resulting in more latent cooling.

Figure 5:
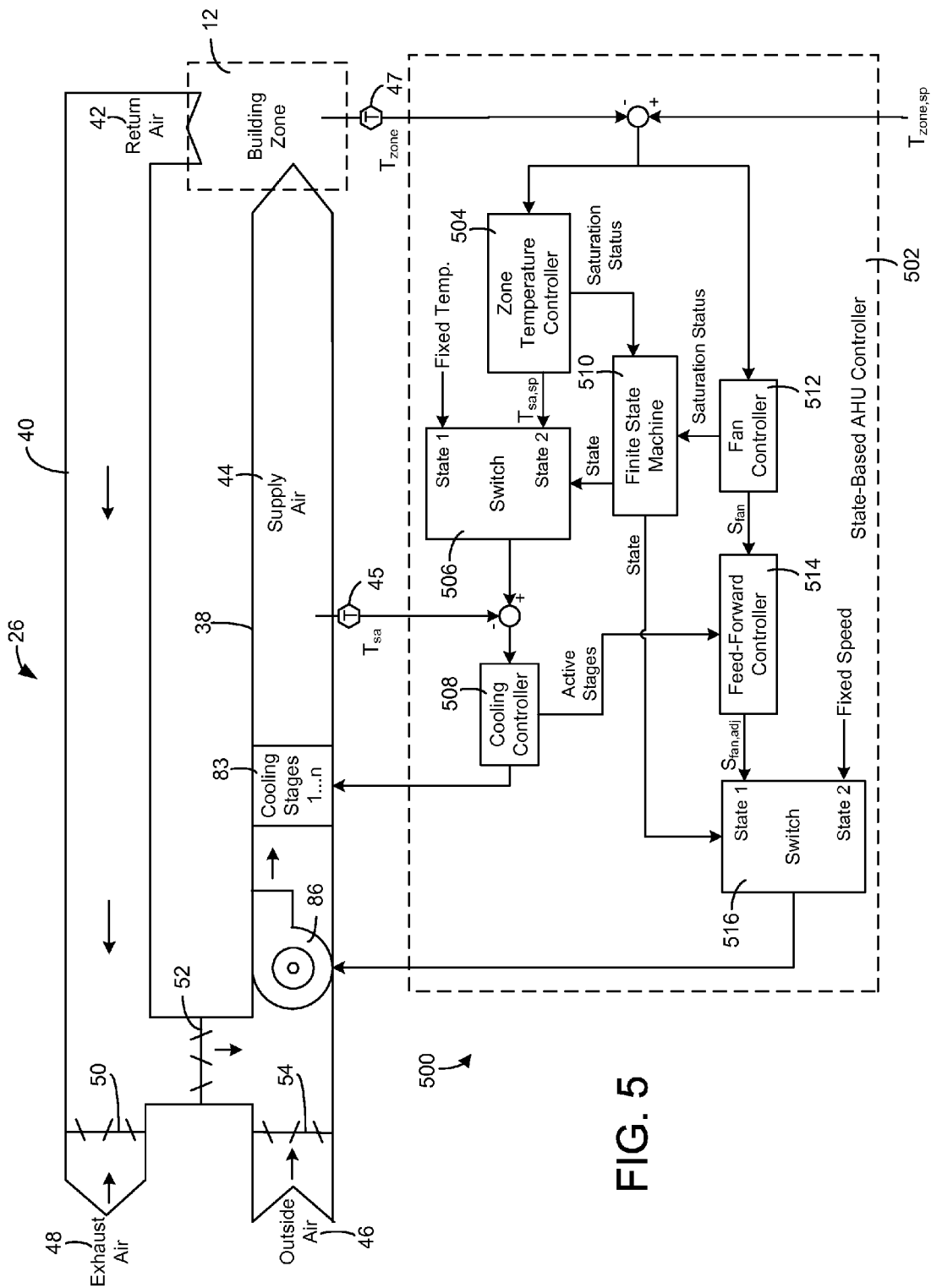
FIG. 5 is a block diagram of a state-based control system which may be used in conjunction with the AHU of FIG. 1, according to an exemplary embodiment.

Referring now to FIG. 5, a block diagram of a state-based control system 500 that may be used in conjunction with AHU 26 is shown, according to an exemplary embodiment. In state-based control system 500, a state-based AHU controller 502 may be used to control both the speed of supply air fan 86 and the amount of cooling provided by cooling stages 83. Like VV control system 400, state-based control system 500 may modulate the speed of supply air fan 86 as the zone load changes to control the supply air temperature $T_{sa}$ to a supply air temperature setpoint $T_{sa,sp}$. However, state-based control system 500 advantageously does not rely on pressure measurements and does not require a downstream VAV controller to control the flow of supply air 44 into building zone 12.

State-based control system 500 is configured to operate in multiple different states or modes. For example, state-based AHU controller 502 is shown to include a finite state machine 510 configured to cause state-based AHU controller 502 to transition between a high cooling load state and a low cooling load state. In the high cooling load state, state-based AHU controller 502 may maintain the temperature of supply air 44 at a fixed setpoint and control the temperature of building zone 12 by modulating a speed of supply air fan 86. In the low cooling load state, state-based AHU controller 502 may operate supply air fan 86 at a fixed speed and control the temperature of building zone 12 by modulating an amount of cooling provided to supply air 44 by cooling stages 83.

State-based AHU controller 502 is shown to include a fan control loop and a cooling control loop. The fan control loop is shown to include a building zone temperature sensor 47, a fan controller 512, and supply air fan 86. Building zone temperature sensor 47 may be configured to measure a temperature $T_{zone}$ of building zone 12. Fan controller 512 may use the difference between the zone temperature $T_{zone}$ and a setpoint temperature $T_{zone,sp}$ for building zone 12 to determine a speed setpoint $S_{fan}$ for supply fan 86. In some embodiments, the fan control loop further includes a feed-forward controller 514 and/or a switch 516. When a change in the number of active cooling stages 83 is detected, feed-forward controller 514 may adjust the fan speed setpoint $S_{fan}$ to generate an adjusted fan speed setpoint $S_{fan,adj}$ and provide the adjusted fan speed setpoint $S_{fan,adj}$ to switch 516. Switch 516 selects whether to use the adjusted fan speed setpoint $S_{fan,adj}$ or a fixed fan speed, depending on the current operating state of state-based control system 500 (described in greater detail below).

Still referring to FIG. 5, the cooling control loop is shown as a cascaded control loop having an outer control loop and an inner control loop. The outer cascaded control loop is shown to include building zone temperature sensor 47, a zone temperature controller 504, and a switch 506. Zone temperature controller 504 may use the difference between the zone temperature $T_{zone}$ and a setpoint temperature $T_{zone,sp}$ for building zone 12 to determine a setpoint $T_{sa,sp}$ for the temperature of supply air 44. Zone temperature controller 504 provides the setpoint $T_{sa,sp}$ to switch 506. Switch 506 selects whether to use the supply air temperature setpoint determined by zone temperature controller 504 or a fixed temperature setpoint to control the temperature of supply air 44, depending on the current operating state of state-based control system 500.

The inner cascaded control loop is shown to include supply air temperature sensor 45, cooling controller 508, and cooling stages 83. Supply air temperature sensor 45 measures the temperature $T_{sa}$ of supply air 44 at a location downstream of cooling stages 83. Cooling controller 508 may use the difference between the supply air temperature $T_{sa}$ and the supply air temperature setpoint provided by switch 506 (e.g., the supply air temperature setpoint determined by zone temperature controller 504 or a fixed temperature setpoint) to determine an output for cooling stages 83. For example, cooling controller 508 may activate or deactivate various stages of cooling stages 83 to control the supply air temperature $T_{sa}$ to the supply air temperature setpoint.

Still referring to FIG. 5, finite state machine 510 may be configured to set the current operating state for state-based AHU controller 502. In some embodiments, finite state machine 510 transitions between a high cooling load state (i.e., "State 1" in FIG. 5) and a low cooling load state (i.e., "State 2 in FIG. 5) based on the saturation status of zone temperature controller 504 and/or fan controller 512. For example, finite state machine 510 is shown receiving saturation status inputs from zone temperature controller 504 and fan controller 512. The saturation status of a controller may indicate whether the control loop in which the controller is located has any further capacity to affect a change in the controlled variable. For example, the saturation status of zone temperature controller 504 may indicate whether zone temperature controller 504 can further decrease the temperature of building zone 12 by increasing the amount of cooling provided by cooling stages 83. The saturation status of fan controller 512 may indicate whether fan controller 512 can further decrease the temperature of building zone 12 by increasing the speed of supply air fan 86.

In some embodiments, saturation status is represented as a percentage (e.g., 0% saturated, 50% saturated, 100% saturated, etc.) or normalized value (e.g., 0.0, 0.5. 1.0, etc.). Higher saturation status values indicate that the corresponding control loop is closer to its maximum capacity and lower saturation status values indicating that the corresponding control loop is further from its maximum capacity. For example, if the current saturation status of zone temperature controller 504 is 100%, any further decrease in the supply air temperature setpoint $T_{sa,sp}$ set by zone temperature controller 504 may not translate into a decrease in the measured zone temperature $T_{zone}$ or the temperature of supply air 44 because the cooling control loop is at maximum capacity (e.g., all of the cooling stages are already active). Similarly, if the current saturation status of fan controller 512 is 100%, any further increase in the fan speed setpoint $S_{fan}$ set by fan controller 512 may not translate into a decrease in the measured zone temperature $T_{zone}$ or the temperature of supply air 44 because the fan control loop is at maximum capacity (e.g., fan 86 is already at its maximum speed).

Finite state machine 510 may use the saturation status of zone temperature controller 504 and/or fan controller 512 to determine whether to transition between the high cooling load state and the low cooling load state. For example, when state-based control system 500 is operating in the high cooling load state, finite state machine 510 may be configured to identify the saturation status of fan controller 512. Finite state machine 510 may compare the saturation status of fan controller 512 with a lower threshold and cause a transition from the high cooling load state into the low cooling load state in response to the saturation status of fan controller 512 being less than or equal to the lower threshold value (e.g., 0%, less than 10%, less than 20%, etc.).

When state-based control system 500 is operating in the low cooling load state, finite state machine 510 may be configured to identify the saturation status of zone temperature controller 504. Finite state machine 510 may compare the saturation status of zone temperature controller 504 with an upper threshold and cause a transition from the low cooling load state into the high cooling load state in response to the saturation status of zone temperature controller being greater than or equal to the upper threshold value (e.g., 100%, greater than 90%, greater than 80%, etc.).

Finite state machine 510 may output a state to switches 506 and 516 indicating the current operating state for state-based control system 500. For example, upon transitioning into the high cooling load state, finite state machine 510 may generate and provide a state output which causes switches 506 and 516 to switch to "State 1," as shown in FIG. 5. In the high cooling load state, switch 506 provides cooling controller 508 with a fixed temperature setpoint and switch 516 provides supply air fan 86 with the adjusted speed setpoint $S_{fan,adj}$ set by feed-forward controller 514. Thus, in the high load cooling state, state-based AHU controller 502 may maintain the temperature of supply air 44 at a fixed temperature setpoint and control the temperature of building zone 12 by modulating a speed of supply air fan 86 based on the speed setpoint $S_{fan}$ determined by fan controller 512.

Upon transitioning into the low cooling load state, finite state machine 510 may generate and provide a state output which causes switches 506 and 516 to switch to "State 2," as shown in FIG. 5. In the low cooling load state, switch 506 provides cooling controller 508 with the supply air temperature setpoint $T_{sa,sp}$ set by zone temperature controller 504 and switch 516 provides supply air fan 86 with a fixed speed setpoint. Thus, in the low load cooling state, state-based AHU controller 502 may operate supply air fan 86 at a fixed speed and control the temperature of building zone 12 by modulating an amount of cooling provided to supply air 44 by cooling stages 83 based on the supply air temperature setpoint $T_{sa,sp}$ set by zone temperature controller 504.

Still referring to FIG. 5, state-based AHU controller 502 is shown to include a feed-forward controller 514. Feed-forward controller 514 may be configured to adjust the fan speed setpoint $S_{fan}$ from fan controller 512 and provide an adjusted fan speed setpoint $S_{fan,adj}$ to supply air fan 86 (e.g., via switch 516). Advantageously, feed-forward controller 514 may be configured to manage disturbances caused by activating or deactivating one or more discrete stages of cooling stages 83. For example, feed-forward controller 514 may be configured to increase the speed of fan 86 when a cooling stage is deactivated and to decrease the speed of fan 86 when a cooling stage is activated such that the amount of cooling provided to building zone 12 remains substantially constant throughout the transition.

The amount of cooling provided to building zone 12 can be expressed using the equation:

$$Q = \dot{m}h = \omega\rho c_p(T_{sa} - T_{zone})$$

where Q is the cooling load, $\omega$ is the flow rate of supply air 44, $\rho$ is the density of supply air 44, $c_p$ is the specific heat capacity of supply air 44, $T_{sa}$ is the temperature of supply air 44, and $T_{zone}$ is the temperature of building zone 12. A negative value for Q indicates that heat is being removed from building zone 12. Assuming steady state conditions prior to changing the number of active stages of cooling stages 83, the zone temperature setpoint $T_{zone,sp}$ can be substituted for the zone temperature $T_{zone}$ and the supply air temperature setpoint $T_{sa,sp}$ can be substituted for the temperature of the supply air $T_{sa}$.

Prior to changing the number of active cooling stages, the amount of cooling provided to building zone 12 can be expressed using the equation:

$$Q_1 = \omega_1 \rho c_p(T_{sa,sp} - T_{zone,sp})$$

where $\omega_1$ is the flow rate of supply air 44 prior to changing the number of active cooling stages, $T_{sa,sp}$ is the temperature setpoint for supply air 44, and $T_{zone,sp}$ the temperature setpoint for building zone 12.

After changing the number of active cooling stages, the amount of cooling provided to building zone 12 can be expressed using the equation:

$$Q_2 = \omega_2 \rho c_p(T_{sa} - T_{zone,sp})$$

where $\omega_t$ is the flow rate of supply air 44 after changing the number of active cooling stages and $T_{sa}$ is the new measured temperature of supply air 44 after changing the number of active cooling stages.

In some embodiments, it is desirable to have the same Q entering building zone 12 before and after the number of cooling stages changes (i.e., $Q_1 = Q_2$). Accordingly, $Q_1$ can be set equal to $Q_2$ and the resulting equation can be solved for the airflow ratio $\omega_2/\omega_1$ that that results in $Q_1 = Q_2$. For example:

$$Q_1 = Q_2$$
$$\omega_1 \rho c_p(T_{sa,sp} - T_{zone,sp}) = \omega_2 \rho c_p(T_{sa} - T_{zone,sp})$$
$$\frac{\omega_2}{\omega_1} = \frac{T_{sa,sp} - T_{zone,sp}}{T_{sa} - T_{zone,sp}}$$

Feed-forward controller 514 may receive a signal from cooling controller 508 indicating when the number of active cooling stages changes. In response to a change in the number of active cooling stages, feed-forward controller 514 may calculate the ratio $\omega_2/\omega_1$ using the preceding equation and apply the calculated ratio as a feed-forward gain to the fan speed setpoint $S_{fan}$. Feed-forward controller 514 may calculate the adjusted fan speed $S_{fan,adj}$ by multiplying $S_{fan}$ by the feed forward gain. For example:

$$S_{fan,adj} = \frac{\omega_2}{\omega_1} S_{fan}$$

$$S_{fan,adj} = \frac{T_{sa,sp} - T_{zone,sp}}{T_{sa} - T_{zone,sp}} S_{fan}$$

Advantageously, the feed-forward compensation technique applied by feed-forward controller 514 enables state-based AHU controller to anticipate and handle disturbances caused by changing the number of active cooling stages before such disturbances have an effect on the measured building zone temperature $T_{zone}$.

Figure 6:
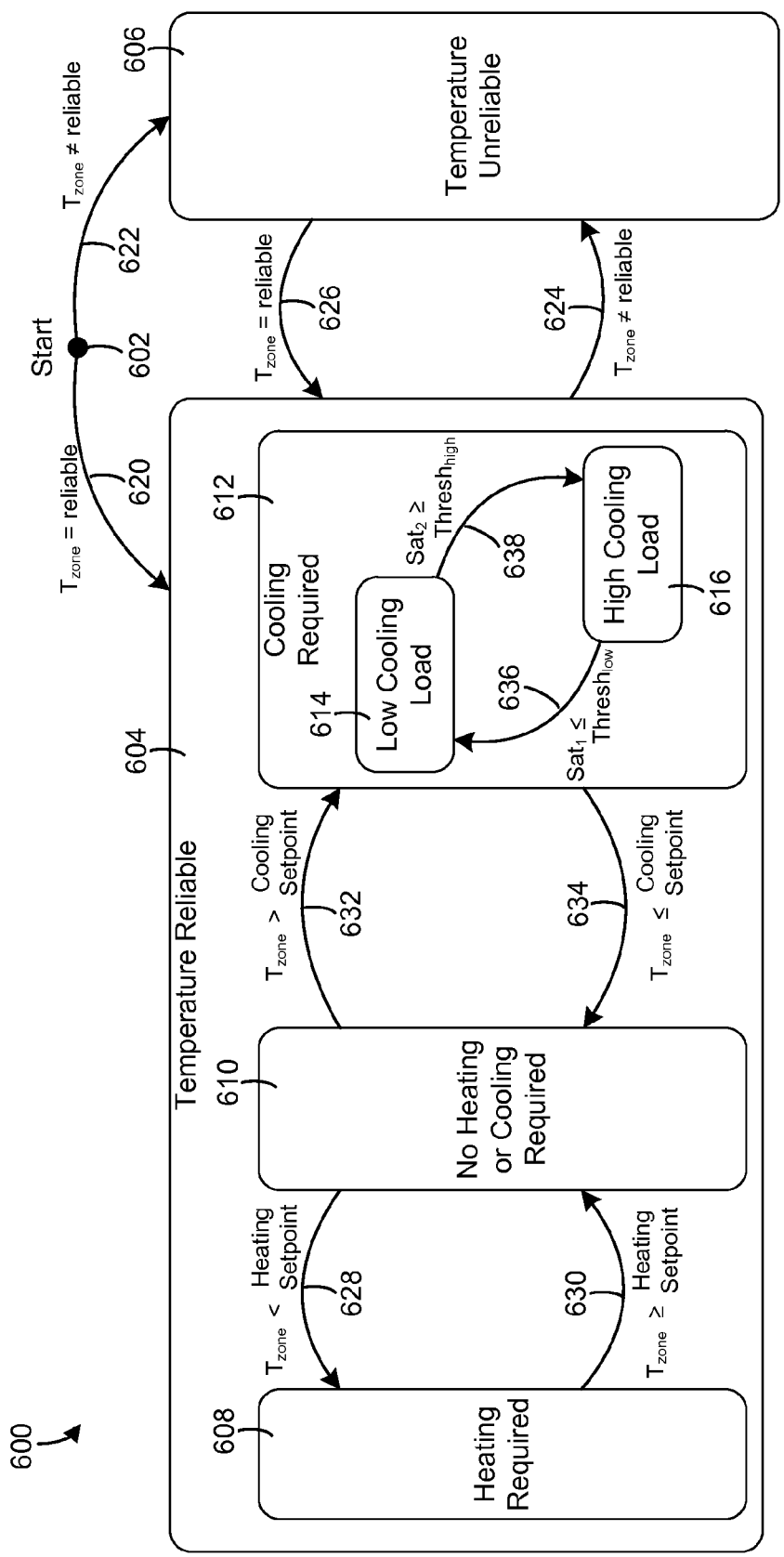
FIG. 6 is a state transition diagram illustrating several operating states which may be used by the state-based control system of FIG. 5 to control the AHU of FIG. 1, according to an exemplary embodiment.

Referring now to FIG. 6, a state transition diagram 600 illustrating several operating states 602-616 of state-based control system 500 are shown, according to an exemplary embodiment. Transitions between operating states 602-616 may be controlled by finite state machine 510 based on the value of $T_{zone}$ and the saturation status of zone temperature controller 504 and/or fan controller 512, as described with reference to FIG. 5. State transition diagram 600 is shown to include a start state 602. In start state 602, finite state machine 510 may determine whether the measured temperature of $T_{zone}$ is reliable. If $T_{zone}$ is reliable, finite state machine 510 may cause state-based control system 500 to transition into a temperature reliable state 604 (transition 620). However, if $T_{zone}$ is unreliable, finite state machine 510 may cause state-based control system to transition into a temperature unreliable state 606 (transition 622). State-based control system 500 may transition from temperature reliable state 604 into temperature unreliable state 606 at any time if the value of $T_{zone}$ is determined to be unreliable (transition 624). Similarly, state-based control system 500 may transition from temperature unreliable state 606 into temperature reliable state 604 if the value of $T_{zone}$ is determined to be reliable (transition 626).

Temperature reliable state 604 is shown to include a heating required state 608, a cooling required state 612, and a no heating or cooling required state 610. Finite state machine 510 may cause state-based control system 500 to transition into heating required state 608 if the value of $T_{zone}$ is less than a heating setpoint (transition 628) and out of heating required state 608 if the value of $T_{zone}$ is greater than or equal to the heating setpoint (transition 630). Finite state machine 510 may cause state-based control system 500 to transition into cooling required state 612 if the value of $T_{zone}$ is greater than a cooling setpoint (transition 632) and out of cooling required state 612 if the value of $T_{zone}$ is less than or equal to the cooling setpoint (transition 634). Finite state machine 510 may cause state-based control system 500 to transition into no cooling or heating required state 610 if the value of $T_{zone}$ is greater than or equal to the heating setpoint (transition 630) or less than or equal to the cooling setpoint (transition 634) and out of no cooling or heating required state 610 if the value of $T_{zone}$ is less than the heating setpoint (transition 628) or greater than the cooling setpoint (transition 632).

Cooling required state 612 is shown to include a low cooling load state 614 and a high cooling load state 616. Finite state machine 510 may cause state-based control system 500 to transition into low cooling load state 614 if the saturation status of fan controller 512 is less than or equal to a lower threshold value (i.e., $Sat_1 \leq Thresh_{low}$). Finite state machine 510 may cause state-based control system 500 to transition into high cooling load state 616 if the saturation status of zone temperature controller 504 is greater than or equal to an upper threshold value (i.e., $Sat_2 \leq Thresh_{high}$).

Referring now to FIG. 7, a chart 700 of the state outputs in a selection of the operating states 602-616 shown in state transition diagram 600 are shown, according to an exemplary embodiment. In heating required state 608, no heating or cooling required state 610, and temperature unreliable state 606, several of the controllers shown in FIG. 5 may be deactivated or not used. For example, chart 700 shows zone temperature controller 504, fan controller 512, cooling controller 508, and cooling stages 83 with values of "off" in states 606-610. In states 608-610 supply air fan 86 may be fixed at a maximum speed.

In low cooling load state 614, zone temperature controller 504 may be used to modulate the supply air setpoint $T_{sa,sp}$ based on the value of $T_{zone}$. Cooling controller 508 may receive the value of $T_{sa,sp}$ from zone temperature controller 504 (e.g., via switch 506) and use the value of $T_{sa,sp}$ to modulate cooling stages 83. In low cooling load state 614, fan controller 512 may be turned off or not used and supply air fan 86 may receive a fixed speed setpoint via switch 516.

In high cooling load state 616, zone temperature controller 504 may be turned off or not used. Cooling controller 508 may receive a fixed supply air setpoint via switch 506 and use the fixed supply air setpoint to modulate cooling stages 83. In high cooling load state 616, fan controller 512 may modulate the fan speed setpoint $S_{fan}$ based on the value of $T_{zone}$. The fan speed setpoint $S_{fan}$ may be adjusted by feed-forward controller 514 and the adjusted value $S_{fan,adj}$ may be passed through switch 616 to supply air fan 86.

Figure 8:
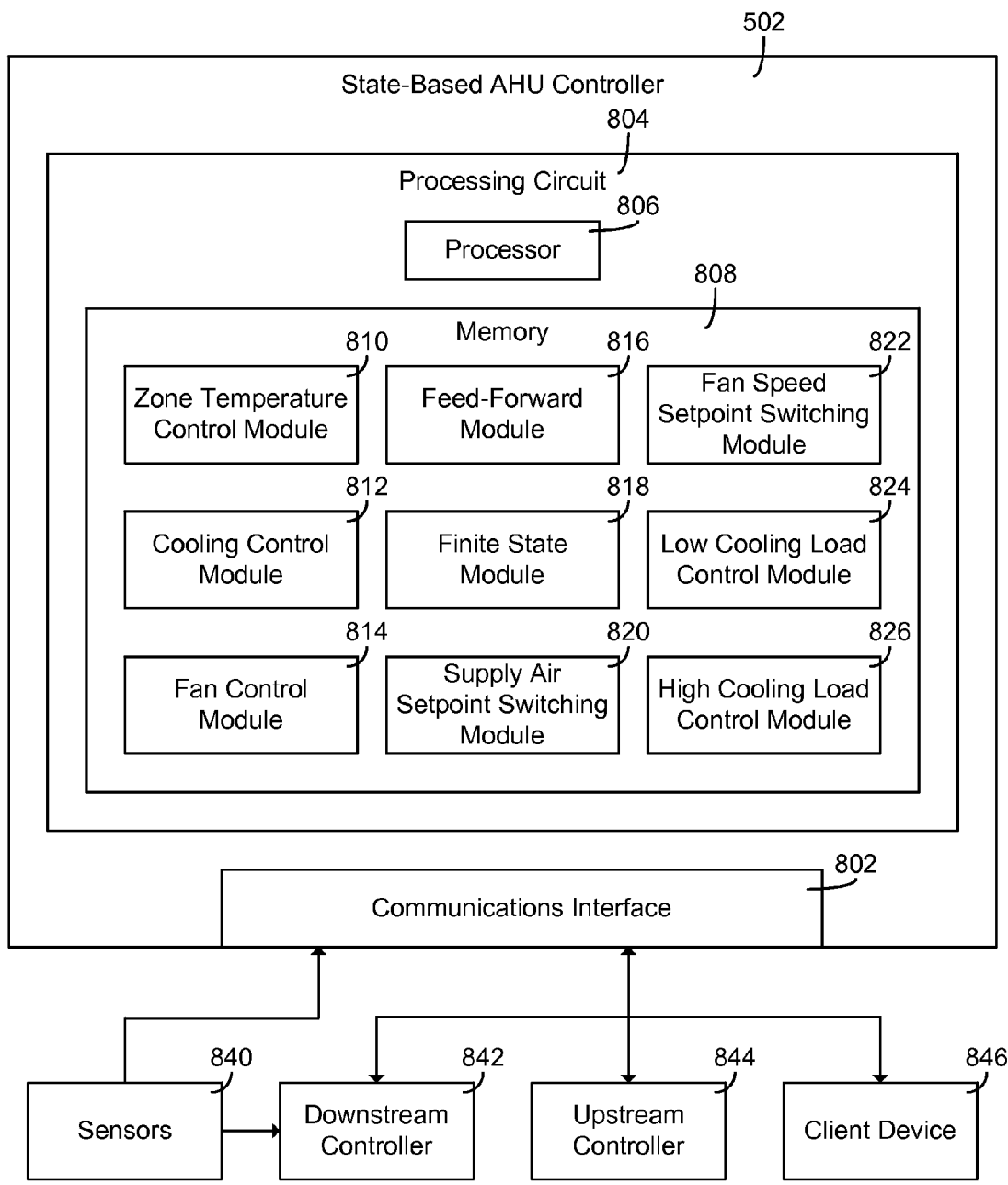
FIG. 8 is a block diagram illustrating the state-based control system of FIG. 5 in greater detail, according to an exemplary embodiment.

Referring now to FIG. 8, a block diagram illustrating state-based AHU controller 502 in greater detail is shown, according to an exemplary embodiment. State-based AHU controller 502 is shown to include a communications interface 802 and a processing circuit 804. Communications interface 802 may include wired or wireless interfaces (e.g., jacks, antennas, transmitters, receivers, transceivers, wire terminals, etc.) for conducting data communications with various systems, devices, or networks. For example, communications interface 802 may include an Ethernet card and/or port for sending and receiving data via an Ethernet-based communications network. In some embodiments, communications interface 802 includes a wireless transceiver (e.g., a WiFi transceiver, a Bluetooth transceiver, a NFC transceiver, etc.) for communicating via a wireless communications network. Communications interface 802 may be configured to communicate via local area networks (e.g., a building LAN) and/or wide area networks (e.g., the Internet, a cellular network, a radio communication network, etc.) and may use a variety of communications protocols (e.g., BACnet, TCP/IP, point-to-point, etc.).

In some embodiments, communications interface 802 receives measurement inputs from sensors 840. Sensors 840 may include, for example, temperature sensor 45 configured to measure the temperature $T_{sa}$ of supply air 44 in supply air duct 38 and temperature sensor 47 configured to measure the temperature $T_{zone}$ of the air in building zone 12. Communications interface 802 may receive sensor inputs directly from sensors 840, via a local or remote communications network, and/or via an intermediary downstream controller 842. For example, if state-based AHU controller is implemented in a supervisory controller or enterprise controller, sensor inputs may be collected by a downstream controller 842 (e.g., a local controller, a device controller, etc.) and forwarded to state-based AHU controller 502. In other embodiments, state-based AHU controller 502 is implemented in AHU 26 and receives sensor inputs directly from sensors 840.

Communications interface 802 may enable communications between state-based AHU controller 502, downstream controller 842, an upstream controller 844 and/or a client device 846. For example, state-based AHU controller 502 may receive sensor inputs from downstream controller 842 via communications interface 802. State-based AHU controller 502 may use the sensor inputs to generate control signals for supply air fan 86 and cooling stages 83 and output the control signals via communications interface 802. Communications interface 802 may facilitate user interaction with state-based AHU controller 502 via client device 846. For example, state-based AHU controller 502 may receive a setpoint temperature for building zone 12 $T_{zone,sp}$ from client device 846 (e.g., a computer terminal, a wall-mounted interface, etc.) and use the setpoint temperature $T_{zone,sp}$ to generate control signals for supply air fan 86 and cooling stages 83 as described above.

Still referring to FIG. 8, processing circuit 804 is shown to include a processor 806 and memory 808. Processor 806 may be a general purpose or specific purpose processor, an application specific integrated circuit (ASIC), one or more field programmable gate arrays (FPGAs), a group of processing components, or other suitable processing components. Processor 806 may be configured to execute computer code or instructions stored in memory 808 or received from other computer readable media (e.g., CDROM, network storage, a remote server, etc.) to perform one or more of the FDD processes described herein.

Memory 808 may include one or more data storage devices (e.g., memory units, memory devices, computer-readable storage media, etc.) configured to store data, computer code, executable instructions, or other forms of computer-readable information. Memory 808 may include random access memory (RAM), read-only memory (ROM), hard drive storage, temporary storage, non-volatile memory, flash memory, optical memory, or any other suitable memory for storing software objects and/or computer instructions. Memory 808 may include database components, object code components, script components, or any other type of information structure for supporting the various activities and information structures described in the present disclosure. Memory 808 may be communicably connected to processor 806 via processing circuit 804 and may include computer code for executing (e.g., by processor 806) one or more of the control processes described herein. Memory 208 is shown to include a zone temperature control module 810, a cooling control module 812, a fan control module 814, a feed-forward module 816, a finite state module 818, a supply air setpoint switching module 820, a fan speed setpoint switching module 822, a low cooling load control module 824, and a high cooling load control module 826.

Still referring to FIG. 8, memory 808 is shown to include a zone temperature control module 810. Zone temperature control module 810 may be configured to perform the functions of zone temperature controller 504, as described with reference to FIG. 5. For example, zone temperature control module 810 may use a difference between a measured zone temperature $T_{zone}$ and a setpoint temperature $T_{zone,sp}$ for building zone 12 to determine a setpoint $T_{sa,sp}$ for the temperature of supply air 44. Zone temperature control module 810 may provide the setpoint supply air temperature $T_{sa,sp}$ to supply air setpoint switching module 820. In some embodiments, zone temperature control module 810 provides a saturation status to finite state module 818. The saturation status provided by zone temperature control module 810 may indicate whether the building zone temperature $T_{zone}$ can be further decreased by modulating the supply air temperature setpoint $T_{sa,sp}$. Finite state module 818 may use the saturation status from zone temperature control module 810 to determine whether to transition from a low cooling load state to a high cooling load state.

Still referring to FIG. 8, memory 808 is shown to include a supply air setpoint switching module 820. Supply air setpoint switching module 820 may be configured to perform the functions of switch 506, as described with reference to FIG. 5. For example, supply air setpoint switching module 820 may receive a state input from finite state module 818 indicating the current operating state of state-based AHU controller 502. If the state input indicates a high cooling load state (e.g., state 616), supply air setpoint switching module 820 may provide cooling control module 812 with a fixed temperature setpoint for use as the supply air temperature setpoint $T_{sa,sp}$. However, if the state input indicates a low cooling load state (e.g., state 614), supply air setpoint switching module 820 may provide cooling control module 812 with the supply air setpoint determined by zone temperature control module 810.

Still referring to FIG. 8, memory 808 is shown to include a cooling control module 812. Cooling control module 812 may be configured to perform the functions of cooling controller 508, as described with reference to FIG. 5. For example, cooling control module 812 may use the difference between the supply air temperature $T_{sa}$ and the supply air temperature setpoint provided by supply air setpoint switching module 820 (e.g., the supply air temperature setpoint determined by zone temperature control module 810 or a fixed temperature setpoint) to determine an output for cooling stages 83. For example, cooling control module 812 may activate or deactivate various stages of cooling stages 83 to control the supply air temperature $T_{sa}$ to the supply air temperature setpoint. In some embodiments, cooling control module 812 provides a signal to feed forward module 816 when the number of active cooling stages changes.

Still referring to FIG. 8, memory 808 is shown to include a fan control module 814. Fan control module 814 may be configured to perform the functions of fan controller 512, as described with reference to FIG. 5. For example, fan control module 814 may use a difference between a measured zone temperature $T_{zone}$ and a setpoint temperature $T_{zone,sp}$ for building zone 12 to determine a setpoint $S_{fan}$ for the speed of supply air fan 86. Fan control module 814 may provide the setpoint fan speed $S_{fan}$ to feed forward module 816. In some embodiments, fan control module 814 provides a saturation status to finite state module 818. The saturation status provided by fan control module 814 may indicate whether the building zone temperature $T_{zone}$ can be further decreased by modulating the setpoint $S_{fan}$. Finite state module 818 may use the saturation status from fan control module 814 to determine whether to transition from a high cooling load state to a low cooling load state.

Still referring to FIG. 8, memory 808 is shown to include a feed-forward module 816. Feed-forward module 816 may be configured to perform the functions of feed-forward controller 514, as described with reference to FIG. 5. For example, feed-forward module 816 may use a signal from cooling control module 812 to detect a change in the number of active cooling stages. When a change in the number of active cooling stages is detected, feed-forward module 816 may adjust the fan speed setpoint $S_{fan}$ to generate an adjusted fan speed setpoint $S_{fan,adj}$ and provide the adjusted fan speed setpoint $S_{fan,adj}$ to fan speed setpoint switching module 822. Advantageously, feed-forward module 816 may be configured to manage disturbances caused by activating or deactivating one or more discrete stages of cooling. For example, feed-forward module 816 may be configured to increase the speed of fan 86 when a cooling stage is deactivated and to decrease the speed of fan 86 when a cooling stage is activated such that the amount of cooling provided to building zone 12 remains substantially constant throughout the transition.

In response to a change in the number of active cooling stages, feed-forward module 816 may calculate a feed-forward gain to apply to the fan speed setpoint $S_{fan}$. In some embodiments, feed-forward module 816 calculates the feed-forward gain using the following equation:

$$\frac{\omega_2}{\omega_1} = \frac{T_{sa,sp} - T_{zone,sp}}{T_{sa} - T_{zone,sp}}$$

where $\omega_1$ is the flow rate of supply air 44 prior to changing the number of active cooling stages, $\omega_2$ is the flow rate of supply air 44 after changing the number of active cooling stages, $T_{sa,sp}$ is the temperature setpoint for supply air 44 (or the temperature of supply air 44 prior to changing the number of active cooling stages), $T_{sa}$ is the new measured temperature of supply air 44 after changing the number of active cooling stages, and $T_{zone,sp}$ the temperature setpoint for building zone 12 (or the measured temperature of building zone 12 prior to changing the number of cooling stages).

Feed-forward module 816 may then calculate the adjusted fan speed $S_{fan,adj}$ by multiplying $S_{fan}$ by the feed forward gain. For example:

$$S_{fan,adj} = \frac{\omega_2}{\omega_1} S_{fan}$$

$$S_{fan,adj} = \frac{T_{sa,sp} - T_{zone,sp}}{T_{sa} - T_{zone,sp}} S_{fan}$$

Still referring to FIG. 8, memory 808 is shown to include a fan speed setpoint switching module 822. Fan speed setpoint switching module 822 may be configured to perform the functions of switch 516, as described with reference to FIG. 5. For example, fan speed setpoint switching module 822 may receive a state input from finite state module 818 indicating the current operating state of state-based AHU controller 502. If the state input indicates a high cooling load state (e.g., state 616), fan speed setpoint switching module 822 may provide supply air fan 86 with the adjusted fan speed setpoint $S_{fan,adj}$ determined by feed-forward module 816. However, if the state input indicates a low cooling load state (e.g., state 614), fan speed setpoint switching module 822 may provide supply air fan 86 with a fixed speed setpoint.

Still referring to FIG. 8, memory 808 is shown to include a finite state module 818. Finite state module 818 may be configured to perform the functions of finite state machine 510, as described with reference to FIG. 5. For example, finite state module 818 may cause state-based AHU controller 502 to transition between the high cooling load state and a low cooling load state. In some embodiments, finite state module 818 receives saturation status inputs from zone temperature control module 810 and/or and fan control module 814. The saturation status of a control module may indicate whether the corresponding control loop has any further capacity to affect a change in the controlled variable.

Finite state module 814 may use the saturation status of zone temperature control module 810 and/or fan control module 814 to determine whether to transition between the high cooling load state and the low cooling load state. For example, when state-based controller 502 is operating in the high cooling load state, finite state module 814 may be configured to identify the saturation status provided by fan control module 814. Finite state module 814 may compare the saturation status of fan control module 814 with a lower threshold and cause a transition from the high cooling load state into the low cooling load state in response to the saturation status provided by fan control module 814 being less than or equal to the lower threshold value (e.g., 0%, less than 10%, less than 20%, etc.).

When state-based controller 502 is operating in the low cooling load state, finite state module 814 may be configured to identify the saturation status provided by zone temperature control module 810. Finite state module 814 may compare the saturation status of zone temperature control module 810 with an upper threshold and cause a transition from the low cooling load state into the high cooling load state in response to the saturation status of zone temperature control module 810 being greater than or equal to the upper threshold value (e.g., 100%, greater than 90%, greater than 80%, etc.). Finite state module 814 may output a state to supply air setpoint switching module 820 and fan speed setpoint switching module 822 indicating the current operating state for state-based controller 502.

Still referring to FIG. 8, memory 808 is shown to include a low cooling load control module 824 and a high cooling load module 826. Low load cooling control module 824 and high cooling load module 826 may be configured to operate state-based control system 500 in the low cooling load state 614 and high cooling load state 616, respectively. In low cooling load state 614, low load cooling control module 824 may operate supply air fan 86 at a fixed speed and control the temperature of building zone 12 by modulating an amount of cooling provided to supply air 44 by the cooling stages 83. In the high cooling load state, high cooling load module 826 may maintain the temperature of supply air 44 at a fixed setpoint and control the temperature of building zone 12 by modulating a speed of supply air fan 86.

Figure 9:
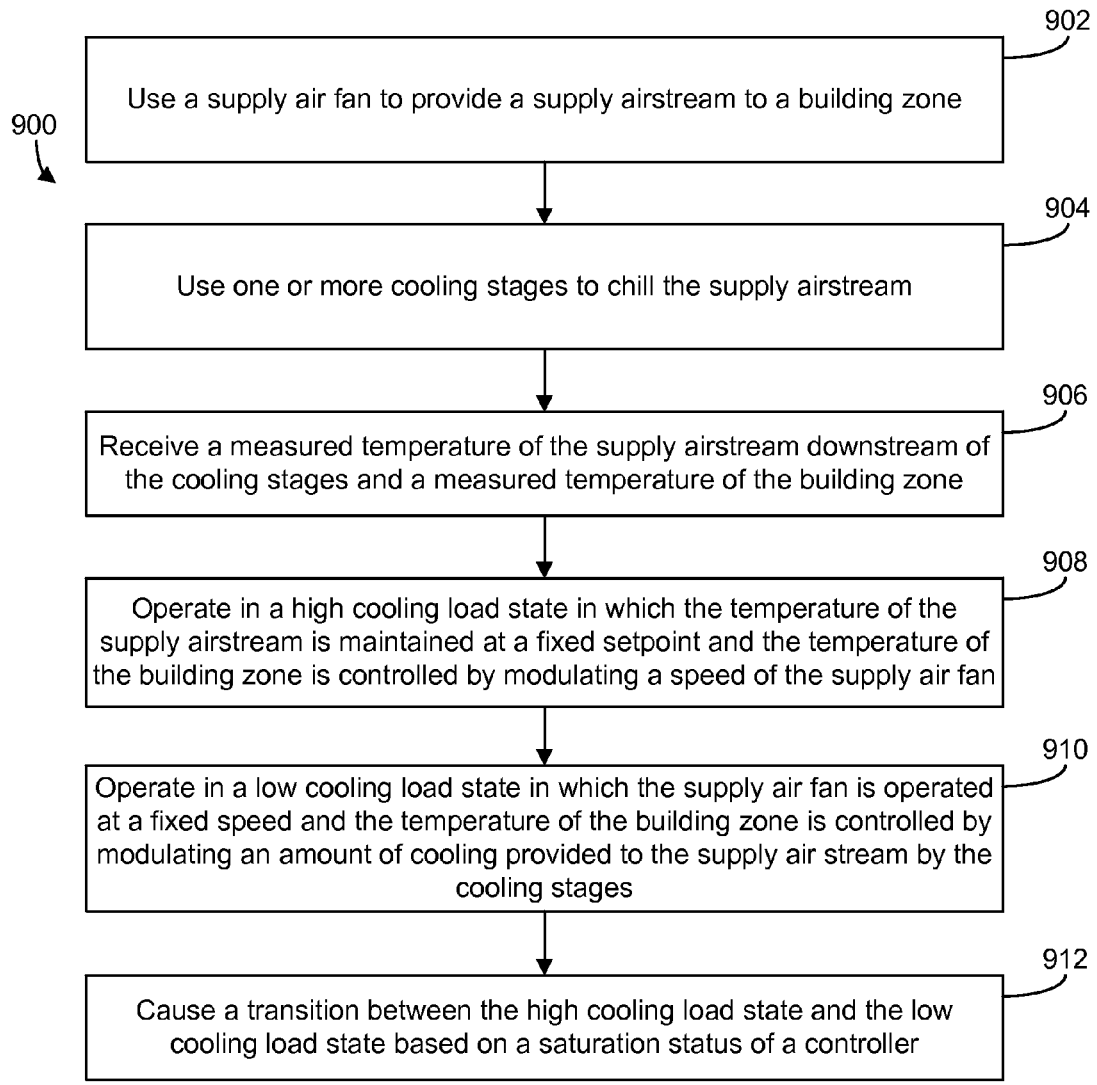
FIG. 9 is a flowchart of a process which may be performed by the state-based control system of FIG. 5 for controlling an AHU such as the AHU of FIG. 1 in a HVAC system, according to an exemplary embodiment.

Referring now to FIG. 9, a flowchart of a process 900 for operating an air handling unit (AHU) in a building HVAC system is shown, according to an exemplary embodiment. In some embodiments, process 900 is performed by state-based AHU controller 502, as described with reference to FIG. 5.

Process 900 is shown to include using a supply air fan to provide a supply airstream to a building zone (step 902) and using one or more cooling stages to chill the supply airstream (step 904). The supply air fan may be a variable speed fan configured to operate at multiple different speeds based on the value of a control signal provided to the supply air fan. Each of the speeds may correspond to a different flowrate of the supply airstream to the building zone. The cooling stages may be positioned in the supply airstream and may include, for example, one or more stages of cooling devices (e.g., cooling coils, evaporators, chillers, etc.) that can be independently activated and deactivated to modulate an amount of cooling applied to the supply airstream.

Still referring to FIG. 9, process 900 is shown to include receiving a measured temperature of the supply airstream downstream of the cooling stages and a measured temperature of the building zone (step 906). The temperature of the supply airstream $T_{sa}$ may be measured by a temperature sensor (e.g., temperature sensor 45) positioned downstream of the cooling stages in the supply airstream. The temperature of the building zone $T_{zone}$ may be measured by a temperature sensor (e.g., temperature sensor 47) positioned in or near the building zone. The measured temperatures may be received at a communications interface of state-based AHU controller 502 and provided to processing circuit 804.

Process 900 is shown to include operating in a high cooling load state in which the temperature of the supply airstream is maintained at a fixed setpoint and the temperature of the building zone is controlled by modulating a speed of the supply air fan (step 908). Operating in the high cooling load state may include using a fan control loop to modulate the speed of the supply air fan based on the temperature of the building zone. Step 908 may include providing a fixed supply air setpoint to a cooling controller (e.g., cooling controller 508). The cooling controller may use the fixed supply air setpoint to maintain the supply airstream at a constant or substantially constant temperature. Step 908 may include using a fan controller (e.g., fan controller 512) to determine a speed setpoint for the supply air fan based on the current temperature of the building zone. The fan controller may modulate the fan speed setpoint to achieve a setpoint temperature for the building zone.

Still referring to FIG. 9, process 900 is shown to include operating in a low cooling load state in which the supply air fan is operated at a fixed speed and the temperature of the building zone is controlled by modulating an amount of cooling provided to the supply air stream by the cooling stages (step 910). Operating in the low cooling load state may include using a cooling control loop. In some embodiments, the cooling control loop is a cascaded control loop. An outer loop of the cascaded control loop may determine a setpoint temperature for the supply airstream based on the temperature of the building zone. An inner loop of the cascaded control loop may then modulate the amount of cooling provided to the supply airstream by the cooling stages to achieve the setpoint temperature for the supply airstream.

Still referring to FIG. 9, process 900 is shown to include causing a transition between the high cooling load state and the low cooling load state based on a saturation status of a controller (step 912). The controller may be, for example, a zone temperature controller of the cooling control loop (e.g., zone temperature controller 504) or a fan controller of the fan control loop (e.g., fan controller 512). In some embodiments, step 912 includes identifying a saturation status of the cooling control loop while operating in the low cooling load state. Step 912 may include causing a transition from the low cooling load state into the high cooling load state in response to the saturation status for the cooling control loop being greater than or equal to a threshold value.

In some embodiments, step 912 includes identifying a saturation status for the fan control loop while operating in the high cooling load state. Step 912 may include causing a transition from the high cooling load state into the low cooling load state in response to the saturation status for the fan control loop being less than or equal to a threshold value. In some embodiments, step 912 includes detecting a change in a number of active cooling stages, calculating a feed-forward gain for the speed of the supply air fan in response to detecting the change in the number of active cooling stages, and adjusting the speed of the supply air fan in accordance with the calculated feed-forward gain.

Calculating the feed-forward gain may include determining a gain for the speed of the supply air fan that causes an amount of cooling provided to the building zone after the change in the number of active stages to be equivalent to an amount of cooling provided to the building zone before the change in the number of active stages. For example, calculating the feed-forward gain may include determining a first difference between a temperature of the supply airstream $T_{sa,sp}$ before the change in the number of active stages and the setpoint temperature $T_{zone,sp}$ for the building zone (i.e., $T_{sa,sp} - T_{zone,sp}$). Calculating the feed-forward gain may further include determining a second difference between a temperature of the supply airstream $T_{sa}$ after the change in the number of active stages and the setpoint temperature $T_{zone,sp}$ for the building zone (i.e., $T_{sa} - T_{zone,sp}$). In some embodiments, the zone temperature $T_{zone}$ can be substituted for the zone temperature setpoint $T_{zone,sp}$ (assuming steady state conditions prior to changing the number of active stages) and the supply air before the change in the number of active stages can be substituted for the supply air temperature setpoint $T_{sa,sp}$. Step 912 may include using a ratio between the first difference and the second difference $$\left( e.g., \frac{T_{sa,sp} - T_{zone,sp}}{T_{sa} - T_{zone,sp}} \right)$$

as the feed-forward gain. The feed-forward gain may be multiplied by the fan speed setpoint $S_{fan}$ to determine an adjusted value $S_{fan,adj}$ for the supply fan setpoint $$\left( e.g., S_{fan,adj} = \frac{T_{sa,sp} - T_{zone,sp}}{T_{sa} - T_{zone,sp}} S_{fan} \right).$$

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for an air handling unit (AHU) in a building HVAC system, the control system comprising:
  a supply air fan configured to provide a supply airstream to a building zone;
  one or more cooling stages configured to chill the supply airstream;
  a supply air temperature sensor configured to measure a temperature of the supply airstream downstream of the cooling stages;
  a zone temperature sensor configured to measure a temperature of the building zone; and
  a controller configured to operate the supply air fan and the cooling stages based on input from the supply air temperature sensor and the zone temperature sensor, the controller comprising a finite state module configured to cause the controller to transition between:
    a high cooling load state in which the controller maintains the temperature of the supply airstream at a fixed setpoint and controls the temperature of the building zone by modulating a speed of the supply air fan, and
    a low cooling load state in which the controller operates the supply air fan at a fixed speed and controls the temperature of the building zone by modulating an amount of cooling provided to the supply airstream by the cooling stages;
  the controller further comprising a feed-forward module configured to:
    detect a change in a number of active cooling stages;
    calculate a feed-forward gain for the speed of the supply air fan in response to detecting the change in the number of active cooling stages, wherein calculating the feed-forward gain comprises determining a gain for the speed of the supply air fan that causes an amount of cooling provided to the building zone after the change in the number of active cooling stages to be equivalent to an amount of cooling provided to the building zone before the change in the number of active cooling stages; and
    adjust the speed of the supply air fan in accordance with the calculated feed-forward gain.

2. The control system of claim 1, wherein the controller comprises:
  a zone temperature control module configured to determine a setpoint for the temperature of the supply airstream based on the temperature of the building zone when the controller is operating in the low cooling load state; and
  a cooling control module configured to modulate the amount of cooling provided to the supply airstream by the cooling stages to achieve the setpoint for the temperature of the supply airstream.

3. The control system of claim 2, wherein the finite state module is configured to:
  identify a saturation status for the zone temperature control module when the controller is operating in the low cooling load state; and
  cause the controller to transition from the low cooling load state into the high cooling load state in response to the saturation status for the zone temperature control module being greater than or equal to a threshold value.

4. The control system of claim 1, wherein the controller comprises a fan control module configured to modulate the speed of the supply air fan based on the temperature of the building zone when the controller is operating in the high cooling load state.

5. The control system of claim 4, wherein the finite state module is configured to:
  identify a saturation status for the fan control module when the controller is operating in the high cooling load state; and
  cause the controller to transition from the high cooling load state into the low cooling load state in response to the saturation status for the fan control module being less than or equal to a threshold value.

6. A control system for an air handling unit (AHU) in a building HVAC system, the control system comprising:
  a fan control loop comprising:
    a supply air fan configured to provide a supply airstream to a building zone,
    a zone temperature sensor configured to measure a temperature of the building zone, and
    a fan controller configured to modulate a speed of the supply air fan based on the measured temperature of the building zone to achieve a temperature setpoint for the building zone;
  a cooling control loop comprising:
    one or more cooling stages configured to chill the supply airstream,
    a zone temperature controller configured to determine a temperature setpoint for the supply airstream based the measured temperature of the building zone, and
    a cooling controller configured to modulate an amount of cooling provided to the supply airstream by the cooling stages to achieve the temperature setpoint for the supply airstream; and
  a feed-forward controller configured to:
    detect a change in a number of active cooling stages;
    calculate a feed-forward gain for the speed of the supply air fan in response to detecting the change in the number of active cooling stages; and adjust the speed of the supply air fan in accordance with the calculated feed-forward gain;

wherein calculating the feed-forward gain comprises:
determining a first difference between a temperature of the supply airstream before the change in the number of active cooling stages and the temperature setpoint for the building zone;
determining a second difference between a temperature of the supply airstream after the change in the number of active cooling stages and the temperature setpoint for the building zone; and
using a ratio between the first difference and the second difference as the feed-forward gain.

7. The control system of claim 6, further comprising a finite state controller configured to cause the control system to transition between:
a high cooling load state in which the cooling control loop maintains the temperature of the supply airstream at a fixed setpoint and the fan control loop controls the temperature of the building zone by modulating the speed of the supply air fan, and
a low cooling load state in which the fan control loop operates the supply air fan at a fixed speed and the cooling control loop controls the temperature of the building zone by modulating an amount of cooling provided to the supply airstream by the cooling stages.

8. The control system of claim 7, wherein the finite state controller is configured to:
identify a saturation status for the cooling control loop when the control system is operating in the low cooling load state; and
cause the control system to transition from the low cooling load state into the high cooling load state in response to the saturation status for the cooling control loop being greater than or equal to a threshold value.

9. The control system of claim 7, wherein the finite state controller is configured to:
identify a saturation status for the fan control loop when the control system is operating in the high cooling load state; and
cause the control system to transition from the high cooling load state into the low cooling load state in response to the saturation status for the fan control loop being less than or equal to a threshold value.

10. A control system for an air handling unit (AHU) in a building HVAC system, the control system comprising:
a supply air fan configured to provide a supply airstream to a building zone;
one or more cooling stages configured to chill the supply airstream;
a supply air temperature sensor configured to measure a temperature of the supply airstream downstream of the cooling stages;
a zone temperature sensor configured to measure a temperature of the building zone; and
a controller configured to operate the supply air fan and the cooling stages based on input from the supply air temperature sensor and the zone temperature sensor, the controller comprising a finite state module configured to cause the controller to transition between:
a high cooling load state in which the controller maintains the temperature of the supply airstream at a fixed setpoint and controls the temperature of the building zone by modulating a speed of the supply air fan, and
a low cooling load state in which the controller operates the supply air fan at a fixed speed and controls the temperature of the building zone by modulating an amount of cooling provided to the supply airstream by the cooling stages;

the controller further comprising a feed-forward module configured to:
detect a change in a number of active cooling stages;
calculate a feed-forward gain for the speed of the supply air fan in response to detecting the change in the number of active cooling stages; and
adjust the speed of the supply air fan in accordance with the calculated feed-forward gain;

wherein calculating the feed-forward gain comprises:
determining a first difference between a temperature of the supply airstream before the change in the number of active stages and a setpoint temperature for the building zone;
determining a second difference between a temperature of the supply airstream after the change in the number of active stages and the setpoint temperature for the building zone; and
using a ratio between the first difference and the second difference as the feed-forward gain.

11. The control system of claim 10, wherein the controller comprises:
a zone temperature control module configured to determine a setpoint for the temperature of the supply airstream based on the temperature of the building zone when the controller is operating in the low cooling load state; and
a cooling control module configured to modulate the amount of cooling provided to the supply airstream by the cooling stages to achieve the setpoint for the temperature of the supply airstream.

12. The control system of claim 11, wherein the finite state module is configured to:
identify a saturation status for the zone temperature control module when the controller is operating in the low cooling load state; and
cause the controller to transition from the low cooling load state into the high cooling load state in response to the saturation status for the zone temperature control module being greater than or equal to a threshold value.

13. The control system of claim 10, wherein the controller comprises a fan control module configured to modulate the speed of the supply air fan based on the temperature of the building zone when the controller is operating in the high cooling load state.

14. The control system of claim 13, wherein the finite state module is configured to:
identify a saturation status for the fan control module when the controller is operating in the high cooling load state; and
cause the controller to transition from the high cooling load state into the low cooling load state in response to the saturation status for the fan control module being less than or equal to a threshold value.

* * * * *